United States Patent
Sharma et al.

(10) Patent No.: US 10,944,680 B2
(45) Date of Patent: Mar. 9, 2021

(54) COMMUNICATIONS METHODS AND APPARATUS

(71) Applicant: Ribbon Communications Operating Company, Inc., Westford, MA (US)

(72) Inventors: Ashish Sharma, Bangalore (IN); Nagesh Kumar Bollapalli, Bangalore (IN); Siddharth Gahlaut, Westford, MA (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 0 days.

(21) Appl. No.: 15/803,435

(22) Filed: Nov. 3, 2017

(65) Prior Publication Data
US 2018/0337862 A1 Nov. 22, 2018

(30) Foreign Application Priority Data
May 22, 2017 (IN) .............................. 201741017878

(51) Int. Cl.
*H04L 12/715* (2013.01)
*H04L 12/721* (2013.01)
(Continued)

(52) U.S. Cl.
CPC ...... *H04L 47/2441* (2013.01); *H04L 41/0896* (2013.01); *H04L 43/087* (2013.01);
(Continued)

(58) Field of Classification Search
None
See application file for complete search history.

(56) References Cited

U.S. PATENT DOCUMENTS 7,852,809 B2 * 12/2010 Oberle ............. H04L 29/06027
370/331
8,874,765 B2 * 10/2014 Kumarasamy ........ H04L 67/145
709/228

(Continued)

OTHER PUBLICATIONS

ITU T Recommendation G.107, ITU T entitled, Series G: Transmission Systems and Media, Digital Systems and Networks The E-model: a computational model for use in transmission planning 2014, Feb. 2014, pp. 1-30, published by International Telecommunication Unit.

(Continued)

*Primary Examiner* — Alpus Hsu
(74) *Attorney, Agent, or Firm* — Straub & Straub; Stephen T. Straub; Michael P. Straub

(57) ABSTRACT

The present invention relates to communications methods, apparatus and systems for collecting metrics and/or traffic routing using SDN principles. In an exemplary method embodiment, the method includes the steps of: operating a SBC to: (i) receive a session initiation signal used to initiate a first media session; (ii) send to an SDN controller session identification information identifying a first RTCP packet stream corresponding to the first media session and causing said SDN controller to control a first open flow switch to establish an entry in a table to cause the first open flow switch to send a copy of the RTCP packets corresponding to the first RTCP packet stream to the SBC while also communicating the RTCP packets corresponding to the first RTCP packet stream towards the intended first RTCP packet stream destination.

27 Claims, 9 Drawing Sheets

(51) Int. Cl.
*H04L 12/725* (2013.01)
*H04L 12/851* (2013.01)
*H04L 12/24* (2006.01)
*H04L 12/26* (2006.01)

(52) U.S. Cl.
CPC ........ *H04L 43/0829* (2013.01); *H04L 45/302* (2013.01); *H04L 43/0852* (2013.01); *H04L 43/0888* (2013.01); *H04L 45/38* (2013.01); *H04L 45/64* (2013.01); *H04L 47/2483* (2013.01)

(56) References Cited

U.S. PATENT DOCUMENTS

| | | | | |
|---|---|---|---|---|
| 9,160,608 | B2* | 10/2015 | Carter | H04L 65/1043 |
| 9,253,326 | B2* | 2/2016 | Kumarasamy | H04M 3/53 |
| 9,264,944 | B1* | 2/2016 | Brewer | H04W 36/0016 |
| 9,521,203 | B2* | 12/2016 | Carter | H04L 65/1043 |
| 9,819,512 | B2* | 11/2017 | Salgueiro | H04L 67/16 |
| 9,854,091 | B2* | 12/2017 | Kaushal | H04L 65/1066 |
| 9,992,331 | B2* | 6/2018 | Chatterjee | H04M 3/42221 |
| 10,003,641 | B2* | 6/2018 | Sahin | H04L 67/1027 |
| 10,320,655 | B1* | 6/2019 | Asveren | H04L 45/306 |
| 2010/0175122 | A1* | 7/2010 | Ballard | H04L 63/1466 726/12 |
| 2015/0341393 | A1* | 11/2015 | Paxinos | G06F 16/955 709/206 |
| 2016/0366189 | A1* | 12/2016 | Hart | H04L 65/1006 |
| 2017/0026512 | A1* | 1/2017 | Ezell | H04M 3/42221 |
| 2017/0054764 | A1* | 2/2017 | Sharma | H04L 65/1069 |
| 2017/0180484 | A1* | 6/2017 | Asveren | H04L 67/141 |
| 2017/0237851 | A1* | 8/2017 | Hassan | H04L 43/08 370/252 |
| 2017/0251028 | A1* | 8/2017 | Bollapalli | H04L 67/141 |
| 2018/0063764 | A1* | 3/2018 | Bollapalli | H04L 65/608 |
| 2018/0287931 | A1* | 10/2018 | Bridges | H04L 41/0806 |

OTHER PUBLICATIONS

OpenFow Switch Specification Version 1.0.0, Open Networking Foundation, dated Dec. 31, 2009.
OpenFow Switch Specification Version 1.3.0, Open Networking Foundation, dated Jun. 25, 2012.
OpenFow Switch Specification Version 1.4.0, Open Networking Foundation, dated Oct. 14, 2013.
OpenFow Switch Specification Version 1.5.0, Open Networking Foundation, dated Dec. 19, 2014.
OpenFow Switch Specification Version 1.5.1, Open Networking Foundation, dated Mar. 26, 2015.

* cited by examiner

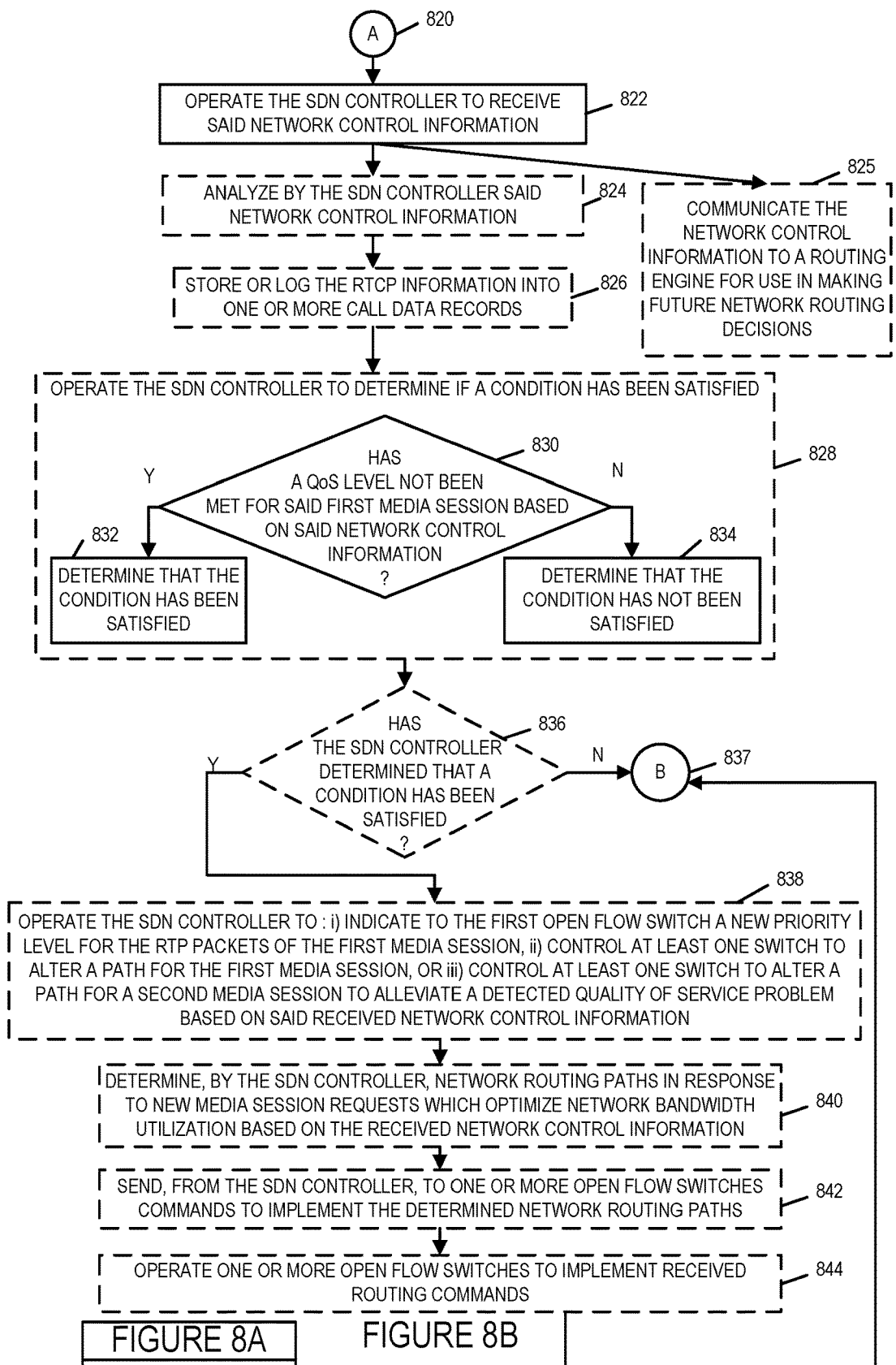

COMMUNICATIONS METHODS AND APPARATUS

RELATED APPLICATION

The present application claims the benefit of the filing date of Indian Provisional Patent Application S.N. 201741017878 on May 22, 2017 which is hereby expressly incorporated by reference in its entirety.

FIELD OF INVENTION

The present invention relates to communications methods, systems and apparatus for collecting metrics, e.g., Quality of Service (QOS), and/or routing of traffic (based on collected metrics) using Software Defined Networking (SDN) Principles.

BACKGROUND

As network functions migrate to the cloud, services previously performed in a monolithic processor are separated and distributed among multiple entities/devices. This is advantageous since it not only allows more complex chaining of separate services but it also allows the execution of a service on the best-suited entity in the cloud. For example, the services provided by session border controllers (SBCs) are being virtualized and distributed into entities/devices in the cloud. This allows for the offloading of some of the packet-processing functionality of the (virtual) SBC into the hardware of the underlying (hardware enabled) network such as for example a software defined network (SDN) in which there is a decoupling of the system that makes decisions about where traffic is sent (the control plane) from the underlying systems that forward traffic to the selected destination (the data plane).

There is a need for new and/or improved methods, apparatus and systems that can solve the technological problems of how to generate and/or collect Quality of Service (QoS) metrics in SDN systems without adding media latency and media backhaul costs. There is a further need for new and/or improved methods, apparatus and systems that can solve the technological problems of how to collect and/or generate QoS metrics from RTCP (RTP Control Protocol) packet streams without adding media latency and media backhaul costs and how to provide such metrics and/or information to SDN controllers. There is a further need for new and/or improved methods, apparatus and systems that solve the technological problems of how to make dynamic routing decisions based on collected and/or generated QoS metrics or information pertaining to those QoS metrics to make routing configuration in the SDN and make network utilization more efficient. There is a further need for new and/or improved methods of how to generate QoS metrics in a SDN system without anchoring media sessions at a SBC.

SUMMARY

The present invention is directed to various features relating to communications methods, systems and apparatus. One or more embodiments of the present invention addresses one or more of the various technical problems described above and herein and improves upon the efficiency of SDN systems. The present invention is directed to solving communications centric technological problems, e.g., Internet Protocol communications centric problems. The present invention also provides a new and/or improved system architectures to solve technological problems discussed herein with respect to SDN systems.

One exemplary embodiment of the invention includes a method of operating a communication system, the method comprising: operating a SBC to receive a session initiation signal used to initiate a first media session, operating the SBC to send to an SDN controller session identification information (such as for example, 5 tuple information—source Internet Protocol (IP) address, source transport port, protocol type, destination IP address, destination transport port) identifying a first Real-time Transport Control Protocol (RTCP) packet stream corresponding to the first media session and causing said SDN controller to control a first open flow switch to establish an entry in a flow table to cause the first open flow switch to send a copy of the RTCP packets corresponding to the first RTCP packet stream to the SBC while also communicating (e.g., forwarding) the RTCP packets corresponding to the first RTCP packet stream towards the intended RTCP packet stream destination. The session identification information may, and in some embodiments does, include other metadata information such as DSCP (Differentiated Services Code Point) value and VLAN (Virtual Local Area Network) tag.

In another exemplary embodiment, the method further comprises operating the SDN controller to generate an entry in a group table, said entry including RTCP packet flow identification information identifying the first RTCP packet flow and an address of the SBC to which copies of packets in the first RTCP flow are to be forwarded. In some such embodiments, the group table is in an Open-Flow controlled switch.

In some embodiment the entry contains a first bucket and a second bucket, said first bucket containing instructions to copy the packets of the first RTCP packet flow and forward said packets toward the SBC, said second bucket containing instructions to forward the packets of the first RTCP flow toward the intended RTCP packet stream destination, e.g., other peer, after performing topology hiding.

In some embodiments, the method includes operating the first open flow switch to forward copies of the RTCP packets for the first media session to the SBC using the SBC address included in the group table as a destination address.

In some embodiments, the method further includes operating the SBC to receive the forwarded copies of the RTCP packets for the first media session from the first open flow switch; identifying that said received RTCP packets correspond to said first RTCP stream based on the SBC IP address port pair at which the RTCP packets are received or from information contained in the received RTCP packets (5 Tuple); analyzing at the SBC the received RTCP packets to determine one or more Quality of Service (QoS) metrics; and operating the SBC to determine optimized routes based on QoS metrics and communicate network routing information to said SDN network controller.

In some embodiments, the method further comprises operating the SBC to send the SDN controller session identification information identifying a second RTCP packet stream corresponding to the first media session and causing said SDN controller to control said first open flow switch to establish an entry in a table to cause the first open flow switch to send a copy of the RTCP packets corresponding to the second RTCP packet stream to the SBC while also communicating (e.g., forwarding) the RTCP packets corresponding to the second RTCP packet stream towards the intended RTCP packet stream destination. The second RTCP packet stream destination typically is different from said first RTCP packet stream destination. For example, the media session may include two unidirectional RTCP streams wherein the first RTCP stream originates at an endpoint device 1 and is sent to an endpoint device 2 while the second RTCP packet stream originates at an endpoint device 2 and is sent to an endpoint device 1.

The present invention is applicable to apparatus and system embodiments wherein one or more devices implement the steps of the method embodiments. In some apparatus embodiments the SBC, SDN controller and SDN switches, e.g., Open Flow switches, include a processor and a memory. The memory including instructions when executed by the processor control the apparatus to operate to perform the steps of various method embodiments of the invention.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 8 comprises the combination of FIGS. 8A and 8B.

FIG. 8B illustrates a second part of a flowchart of an exemplary method in accordance with an embodiment of the present invention.

DETAILED DESCRIPTION

Figure 1:
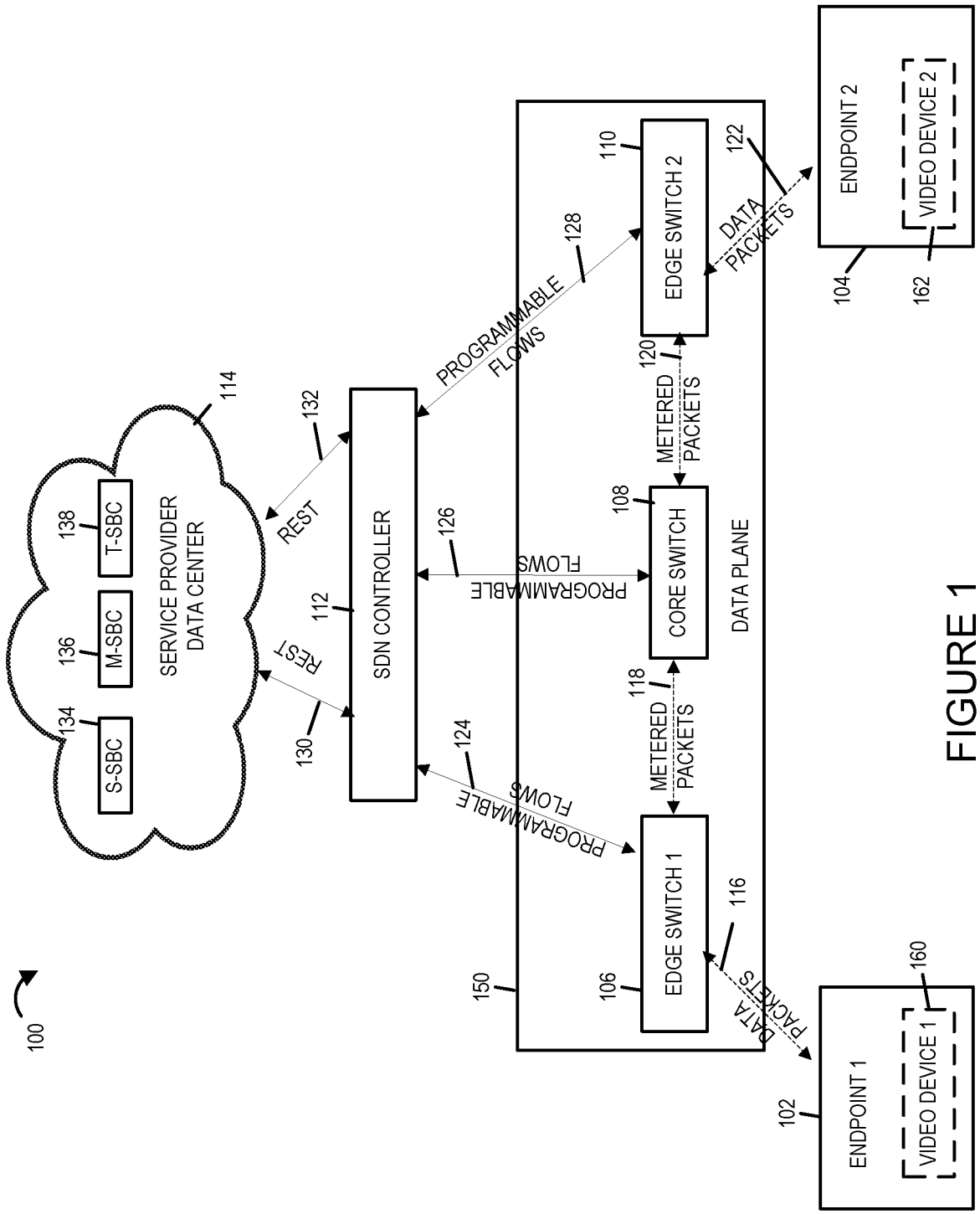
FIG. 1 illustrates an exemplary SDN network system in accordance with an embodiment of the present invention.

SDN (Software Defined Networking) defines an architectural approach to building networks, primarily focusing on the separation of the control and data planes to allow more flexibility in how the control plane is built and what it exposes to applications. As more networks adopt SDN concepts, it opens up opportunities to redefine how an application such as a Session Border Controller (SBC) functions in an SDN environment.

The traditional model for an SBC is a more or less vertically integrated unit, with a tightly coupled control and data plane of its own. The control plane is call signaling (Session Initiation Protocol) aware, and uses this information to dictate how the Internet Protocol (IP) packets for media pass through its data plane. And by virtue of this interaction the SBC is able to police, control and otherwise impact on the packets that are specifically routed through it. The integrated SBC can be deployed as a Virtual Network Function (VNF) in European Telecommunications Standards Institute (ETSI) defined Network Function Virtualization (NFV) architecture.

It is further possible to decouple the multiple services offered by an integrated SBC into independent service components (i.e., S-SBC, M-SBC, and T-SBC) as separately deployable components/VNF's and as scalable elements in an ETSI-defined NFV network. Each component of the decomposed SBC component is realized as a cluster providing one or more services. These services include call control, routing and policy, signaling normalization, gating and metering, Network Address Translation (NAT) detection, transcoding, transrating, etc. At a high level these services include the following.

1. The S-SBC (also sometimes referred to herein as a signaling SBC) is a service/component that anchors signaling and exposes signal interface(s) to the external peers and chains other SBC service components as described below on a need basis.
2. The M-SBC (also sometimes referred to herein as a media SBC) is a service/component that anchors media and exposes media interface(s) to the external peers. The M-SBC provides media Denial of Service (DOS)/ Distributed Denial of Service (DDOS) protection, bandwidth policing, topology hiding, IPv4/IPv6 interworking, VLAN (Virtual Local Area Network) tagging, DSCP (Differentiated Services Code Point) marking, Far end Network Address and Port Translation Learning, RTP (Real-time Transport Protocol) Inactivity detection, SRTP (Secure Real-time Transport Protocol) Relay and related services.
3. The T-SBC (sometimes referred to herein as a transcoding SBC) is a service/component that anchors media only if media transcoding/processing is required. The T-SBC is typically hidden behind the M-SBC cluster and exposes its services only on the internal media interface. It provides media interworking related services such as for example, transcoding, transrating and/or trans-sizing of media flows.

Be it an integrated SBC model or a distributed SBC model, the SBC is able to police media traffic specifically routed through it. Although this approach has performed as required for many years now, the application/approach has technical problems. The approach can be made more effective and efficient if it were able to influence IP flows at other points in the network and not just as the packets hit its media plane. For example, it is typically desirable to block "bad" flows/packets as early as possible by moving the decision to forward or drop packets as close to the source as possible. Similarly an SBC is often expected to guarantee bandwidth for certain classes of traffic and indeed prioritize how to allocate contended bandwidth to the most important (based on policy) flows. The SBC's effectiveness in performing this task is constrained however by the fact that it is only performing this task at the point where the packets cross the SBC's data plane. The SBC has no visibility or influence on how bandwidth is utilized at all other points in the network.

With the advent of Software Defined Networking, the entire network's forwarding plane (i.e., SDN-enabled switch infrastructure) can be used as one big data plane for the SBC. By using the SBC control plane (acting similar to an application on top of the SDN controller) and programming flow forwarding rules (typically via a controller) in Open Flow (OF) enabled switches, the SBC can adjust the flow behavior of packets dynamically across the network. In other words, media forwarding rules can be applied at SDN/OF-enabled switches directly as opposed to routing media streams to yet another media-aware node such as for example an M-SBC (described above). While the OpenFlow protocol is the most well-known of the SDN protocol for southbound Application Programming Interfaces (APIs), it is not the only one available. The same or similar approach can be used for non-openflow enabled or vendor specific switches using Network Configuration Protocol (NetConf), HTTP, or OPFlex to communicate with the switches and routers to install and make configuration changes.

FIG. 1 illustrates an SDN network system 100 including IP Endpoint 1 102, IP Endpoint 2 104, Edge Switch 1 106, Core Switch 108, Edge Switch 2 110, SDN controller 112, cloud service provider data center 114 and communications links 116, 118, 120, 122, 124, 126, 128, 130 and 132. The IP Endpoint device 1 102 optionally includes a video device 1 160 for recording and/or playing video. The IP Endpoint device 2 104 optionally includes a video device 2 162 for recording and/or playing video such as video exchanged during a multimedia session between the IP Endpoint device 1 102 and the IP Endpoint device 2 104. The cloud service provider data center 114 includes S-SBC 1 134 node/device, optional M-SBC 1 136 node/device, and optional T-SBC 1 138 node/device. In some embodiments, the S-SBC 1 134, M-SBC 1 136, and T-SBC 1 138 are each hardware devices including a processor, memory, hardware input/output interfaces including transmitters and receivers and programming instructions which is executed to operate the S-SBC 1 134, M-SBC 1 136 and T-SBC 1 138. In some embodiments, the cloud service provider data center 114 is a cloud computing system/network in which the S-SBC 1 134, M-SBC 1 136, and T-SBC 1 138 are applications operating on compute nodes in the cloud computing system/network operated by the service provider. Communications link 116 couples/connects IP endpoint 1 102 to edge switch 1 106. Communications link 118 couples/connects IP edge switch 1 106 to core switch 1 108. Communications link 120 couples/connects core switch 108 to end switch 2 110. Communications link 122 couples/connects edge switch 2 to IP endpoint 2 104. Communications link 124 couples/connects edge switch 1 to SDN controller 112. Communications link 126 couples/connects core switch 108 to SDN controller 112. Communications link 128 couples/connects edge switch 2 110 to SDN controller 112. Communications links 130 and 132 couples/connects the SDN controller 112 to the cloud service provider data center 114.

The SBCs, e.g., S-SBC 1 134, M-SBC 1 136 and T-SBC 1 138, communicate with the SDN Controller in some embodiments using a protocol that is not bounded. In some embodiments, the communication protocol used to communicate between the SDN controller 112 and various devices in the cloud service provider data center is based on extending a representational state transfer Application Programming Interface (REST API) provided by the SDN Controller to the device, e.g., SBCs of the cloud. The SDN controller 112 dynamically programs flows in the SDN system 100.

The signaling plane of the SBC receives the signaling packets and uses this to determine what type of session (or other traffic) they relate to. The signaling SBC (S-SBC) decodes the Session Description Protocol (SDP) information in Session Initiation Protocol (SIP) messages and determines the IP 5-tuple information (source IP address/port number, destination IP address/port number and the IP protocol in use) pertaining to a flow (RTP or RTCP). Based on the session state information that the signaling SBC maintains, the signaling SBC (S-SBC) determines if the packets should be discarded, rate limited, simply forwarded after providing topology hiding, or routed to some specific agent (such as a transcoding device) for media manipulation.

The traditional functions that the media layer of an SBC performs (read M-SBC) (which does not require/need media interworking/transcoding) are offloaded to SDN-enabled/OF-controlled switches. These functions for example include: (1) rate limiting/policing (e.g., allowing RTP packets to pass through only from established session and perform bandwidth policing based on the codec negotiated), (2) Topology Hiding (e.g., based on the Session Description Protocol messages exchanged in the Session Initiation Protocol signaling, the signaling SBC (e.g., S-SBC 1 134) (via SDN controller 112) can instruct the OF-enabled switch to rewrite IP address(es) as it forwards the RTP/RTCP packets from the untrusted side to the trusted side (and vice versa)); (3) V4-V6 Interworking, (4) VLAN Tagging, (5) Differentiated Services Code Point (DSCP) marking; (6) Far end NA(P)T (Network Address (and Port) Translation) Learning; (7) Real-time Transport Protocol (RTP) Inactivity detection; and Security Real-time Transport Protocol (SRTP) Relay.

Most or all of these M-SBC functions can be offloaded to SDN-enabled switches, e.g., SDN-enabled/supported Open Flow switches. Only those call-flows needing/requiring media processing/interworking need to be anchored at T-SBC and these would typically be only a specific percentage of calls. Offloading relay aspects to a switch provides a huge cost-advantage for the operator of the system. In those embodiments in which all of the M-SBC functions are off loaded to SDN-enabled switches, the M-SBC 136 is not necessary and is not included in the system.

In Voice Over Internet Protocol (VOIP) deployments, Real-time Transport Control Protocol (RTCP) statistics are used for QoS (Quality of Service) measurement and the SBC takes necessary actions if needed to improve the QoE (quality of experience for the user). While an SDN-enabled switch, e.g., SDN-enabled/supported Open Flow switch can perform most of the media relay function (for RTP/RTCP flows), it can't perform RTCP packet analysis and in those deployments (needing QoS measurements), this would result in every call being steered towards a media processing entity, i.e., T-SBC.

However, in the present invention a mechanism in which the value added (RTCP) streams used for generating QoS metrics are duplicated using SDN principles without needing to have every call go through yet another hop which would increase the media latency and media backhaul costs. The invention therein solves the problem of how to generate QoS metrics in an SDN system without adding media latency and media backhaul costs. For without the invention of duplicating (and forwarding the RTCP stream), a media interworking application is required to anchor the media and collect RTCP based statistics which results in increases in backhaul costs and reduction in Quality of user Experience (QoE) due to increased media latency. And, because the media interworking application is required to anchor the media to collect the RTCP based statistics, it requires that a media interworking appliance be in the loop for every call/media session.

In an exemplary embodiment of the invention, a SDN enabled distributed SBC directs OF-enabled switches using SDN principles to duplicate/fork specific media stream(s) toward a particular destination, i.e., RTCP media streams are forked towards the signaling SBC (S-SBC) so that the signaling SBC can collect/generate value added media statistics that, may be, and in some embodiments are, used to decipher, derive and/or generate the quality of the RTP media stream corresponding to the RTCP stream, e.g., determine QoS metrics and/or a QoS level for the RTP media stream.

Furthermore, in some embodiments, the signaling SBC and/or SDN controller uses the determined quality of media stream to make key decisions to re-program/re-route the media stream flow in real time and/or make routing decisions on new and/or other existing media flows to optimize one or more network parameters, e.g., network bandwidth utilization, network congestion, network delays, etc. Furthermore, the invention does not require that the endpoint devices, e.g., user equipment devices be modified in any way or include API (application programming interface) or software to collect/capture and/or report QoS metrics. Moreover, not only are specialized or modified endpoint devices not needed/used to implement the invention but the QoS metrics are collected/captured and used without knowledge of this activity by the endpoint devices.

Figure 2:
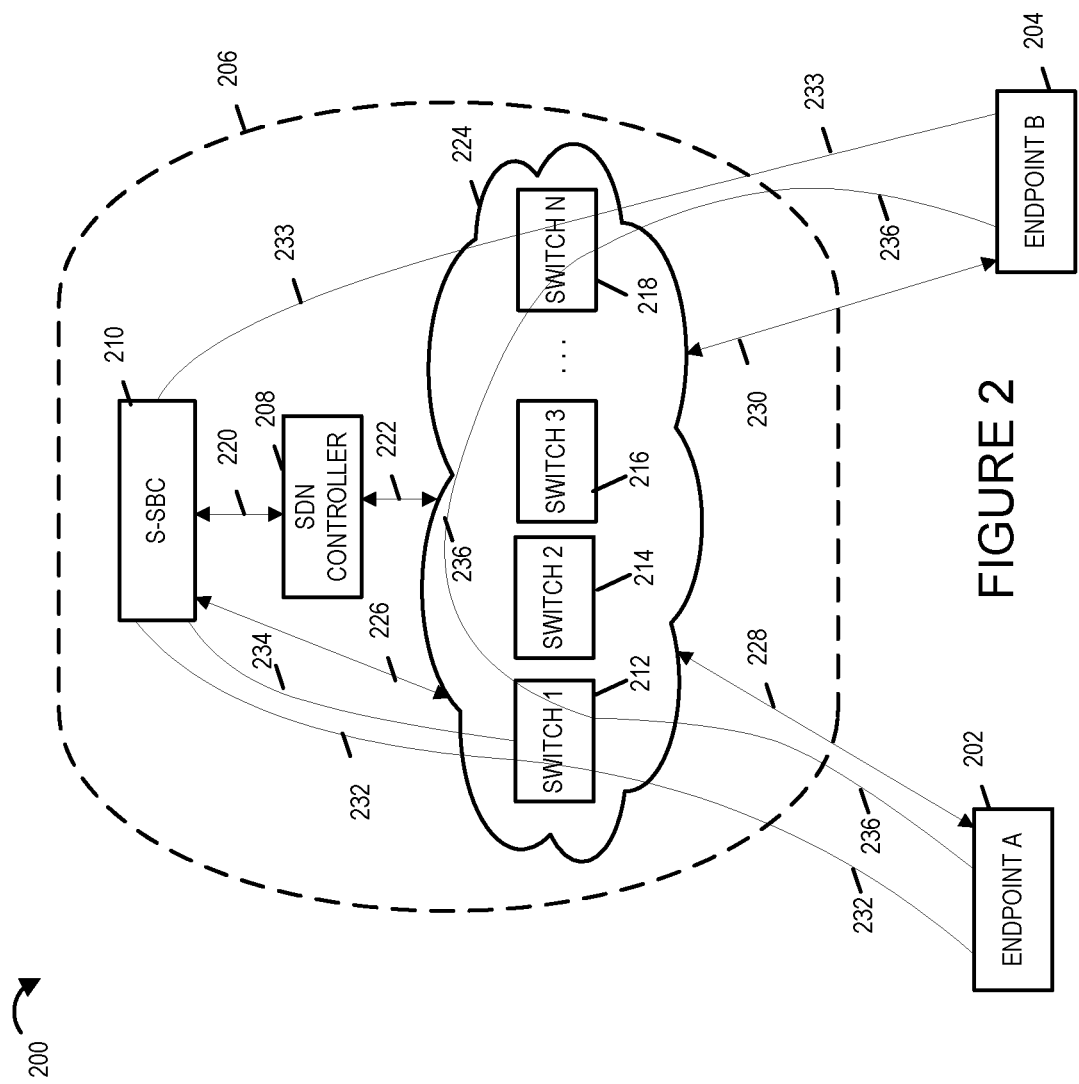
FIG. 2 illustrates an exemplary system and signaling flow in accordance with an embodiment of the present invention.

FIG. 2 illustrates an exemplary system 200 and exemplary signaling and media paths/routes in accordance with an exemplary embodiment of the present invention. The system 200 includes endpoint device A 202, endpoint device B 204, a SDN network 206 including a plurality of communications switches, a SDN controller 208 and a signaling SBC (S-SBC) 210. Endpoint devices A 202 and B 204 may be, and in some embodiments are, user equipment devices such as for example communications devices (e.g., cell phones, mobile phones, smartphones, IP phones, computers, lap tops, notepads, VOIP phones). The plurality of communications switches include switch 1 212, switch 2 214, switch 3 216, . . . , switch N 218 where N is a positive number. The communications switches of the SDN network 206 including switches 212, 214, 216, . . . , 218 are SDN-enabled/supported switches such as for example SDN-enabled/supported Open Flow switches. The S-SBC 210, SDN Controller 208, and communications switches are part of a software defined network (SDN) system and are coupled together via communications links. The plurality of switches include edge switches and in some embodiments one or more core network communications switches which couple edge switches to other devices and switches in the SDN network. Both the edge switches and the core network communications switches are controlled by the SDN controller 208. The edge switches which are positioned on the edge of the software defined network, are controlled by the SDN controller and serve as ingress/egress switches for session initiation requests and media sessions being routed through the software defined network controlled by the SDN controller 208. In the exemplary embodiment switch 1 206 and switch N 218 are edge switches which are positioned on the edge of the software defined network controlled by the SDN controller 208. While only two endpoint devices 202 and 204 are illustrated as being coupled to the SDN network 206 for purposes of simplifying the example for explanatory purposes, the system 200 may, and in most embodiments does, include a plurality of endpoint devices coupled to the SDN network 206. The S-SBC 210 is coupled to the SDN controller 208 via a communications link 220. In some embodiments, the communication protocol used to communicate between the SDN controller 208 and S-SBC 210 is based on extending a representational state transfer Application Programming Interface (REST API) provided by the SDN Controller to the S-SBC 210. The SDN controller 208 dynamically programs flows in the SDN network 206.

The cloud 224 represents communications links of the SDN network that couple/connect the switches of the SDN network 206 together. The SDN controller 208 is coupled to the communications switches 1 212, switch 2 214, switch 3 216, . . . , switch N 218 via communications link 222 shown as coupled to cloud 224. S-SBC 210 is coupled to the communications switches 1 212, switch 2 214, switch 3 216, . . . , switch N 218 via communications link 226 which is illustrated as being connected to cloud 224. The endpoint device A 202 is coupled to the SDN network 206 cloud 224 via communications link 228. The endpoint device B 204 is coupled to the SDN network 206 cloud 224 via communications link 230. Lines 232 and 233 represents signaling traffic communicated between endpoint device A 202 and endpoint device B 204 via switch 1 212, S-SBC 210, switch N 218 and communications links 226, 228, and 230. Line 236 represents the media traffic communicated between endpoint A 202 and endpoint B 204 via switch 1 212, switch N 218 and communications links of the system 200 including communications links 228 and 230. Line 234 represents the forked RTCP traffic transmitted from switch 1 212 to S-SBC 210 over communications link 226.

Embodiments of the invention will now be explained in connection with system 200 of FIG. 2. System 200 of FIG. 2 illustrates how RTCP QoS metrics are collected without anchoring media streams at an external media-aware node (such as for example an SBC) but instead are collected in an optimized manner by forking RTCP streams using Software Defined Network principles resulting in better quality of experience, dynamic real-time routing and re-routing of media streams to achieve optimizations, and optimization of backhaul costs.

At the time of session establishment and as part of installing flow rules on communications switches 1 212, 2 214, 3 216, . . . N 218 which for example are SDN-enabled Open Flow switches, the signaling plane of the S-SBC 210 uses the SDN control plane interface and communications link 220 to communicate information, requests and/or instructions to the SDN controller 208. In turn the SDN controller 208 acts on the received information, requests and/or instructions and communicates instructions to one or more of the plurality of communications switches of the SDN network, e.g., communications switch 1 212 or switch N 218, to duplicate and/or fork a copy of one or more specific media streams, e.g., the RTCP media stream from endpoint A 202 to endpoint B 204 and/or RCTP media stream from endpoint B 204 to endpoint A 202, towards a specific entity, e.g., S-SBC 210.

Figure 6:
FIG. 6 illustrates the protocol levels which may be modified by an Open Flow switch.

The communications switches are software controlled switches that support programmable unidirectional flows. The software controlled switches are programmed by the SDN controller 208. One, some, or all of the plurality of communications switches support duplicating and/or forking a specific flow using a group table so that a copy of the specific stream can be redirected to a new destination. As a session with RTP and RTCP media streams is established, the corresponding flows are established and/or programmed on the switches dynamically. The S-SBC 210 then programs one or more of the communications switches (via SDN controller) through which the RTP and RTCP media streams are programmed to duplicate only the RTCP stream using a Group Table and by modifying the Level 2 and/or Level 3 destination transport address (i.e., Ethernet destination which is a level 2 destination transport address and/or an Internet Protocol (IP) destination address which is a level 3 destination transport address) for the RTCP stream since the RTCP stream contains value added statistics for the corresponding RTP stream. Diagram 600 of FIG. 6 illustrates the levels L1, L2, L2.5, L3 and L4 which may be modified by an Open Flow switch. The copied RTCP stream is then forked towards the S-SBC 210 which correlates the RTCP stream in the context of an existing session and collects/generates QoS (Quality of Service) metrics for an on-going session and in some embodiments for a given trunk group (i.e. group of endpoints/peers).

The SDN network 206 is configured so that the S-SBC 210 will anchor session signaling traffic traversing the network. The SDN controller 208 sends programming instructions to edge communications switches programming them to forward signaling traffic received from outside the SDN network to the S-SBC 210.

This is pictorially represented in FIG. 2. The signaling traffic between endpoint A (peer A) 202 and S-SBC 210 is represented by line 232. Note it passes through switch 1 212. The signaling traffic between S-SBC 210 and endpoint B 204 (peer B) is represented by line 233 which passes through switch N 218. The media traffic (which includes RTP/RTCP flows) is represented by line 236. Line 234 represents the forked RTCP traffic.

The signaling from endpoint A and endpoint B is anchored at S-SBC 210—this is depicted by lines 232 and 233 respectively shown in FIG. 2. When RTCP packets are received from endpoint A 202 with a destination of SBC's media IP address towards Endpoint A (or received from endpoint B 204 with a destination of SBC's media IP address towards Endpoint B), the switch 1 212 (e.g., an Open Flow-enabled switch) forks the RTCP packets (that are meant to be received on a specific RTCP UDP port) towards S-SBC 210 shown as line 234. It also forwards the RTCP packet towards the other endpoint involved in the session after performing topology hiding—for e.g., RTCP packets from Endpoint A are forwarded to Endpoint B and vice versa. S-SBC 210 correlates these RTCP packets to one of the ongoing sessions. In some embodiments, S-SBC 210 correlates these RTCP received forked packets based on one of the following mechanism:

- S-SBC 210 in some embodiments listens on a specific IP Address and port (the port being dynamically allocated for every stream of a given session and installed in a rule on a switch (e.g., Open Flow (OF) switch (based on which it forks)). S-SBC 210, based on the port on which RTCP packets are received, could correlate to a given session and hence aggregate QoS statistics on a per-Trunk Group (TG) basis.
- S-SBC 210 in some embodiments listens on a specific IP address and (fixed) port—but uses the media IP-tuple information of the endpoint or peer to know which session the RTCP stream belongs to. The premise here being that the RTCP address (IP address and port) of a given peer uniquely identifies the corresponding session.

This can be realized in a closed loop to perform QoS based routing and redirect the call in real time. Some of the various statistics that can be used for each leg are R-Factor, network-packet loss, packets discarded due to jitter, duplicate frames etc. Depending upon these statistics if the QoS falls below a predefined level an input can be provided by the S-SBC 210 to the SDN controller 208, which can select an alternative path for a given flow. Alternatively, QoS statistics can be used to dynamically select routes.

Figure 4:
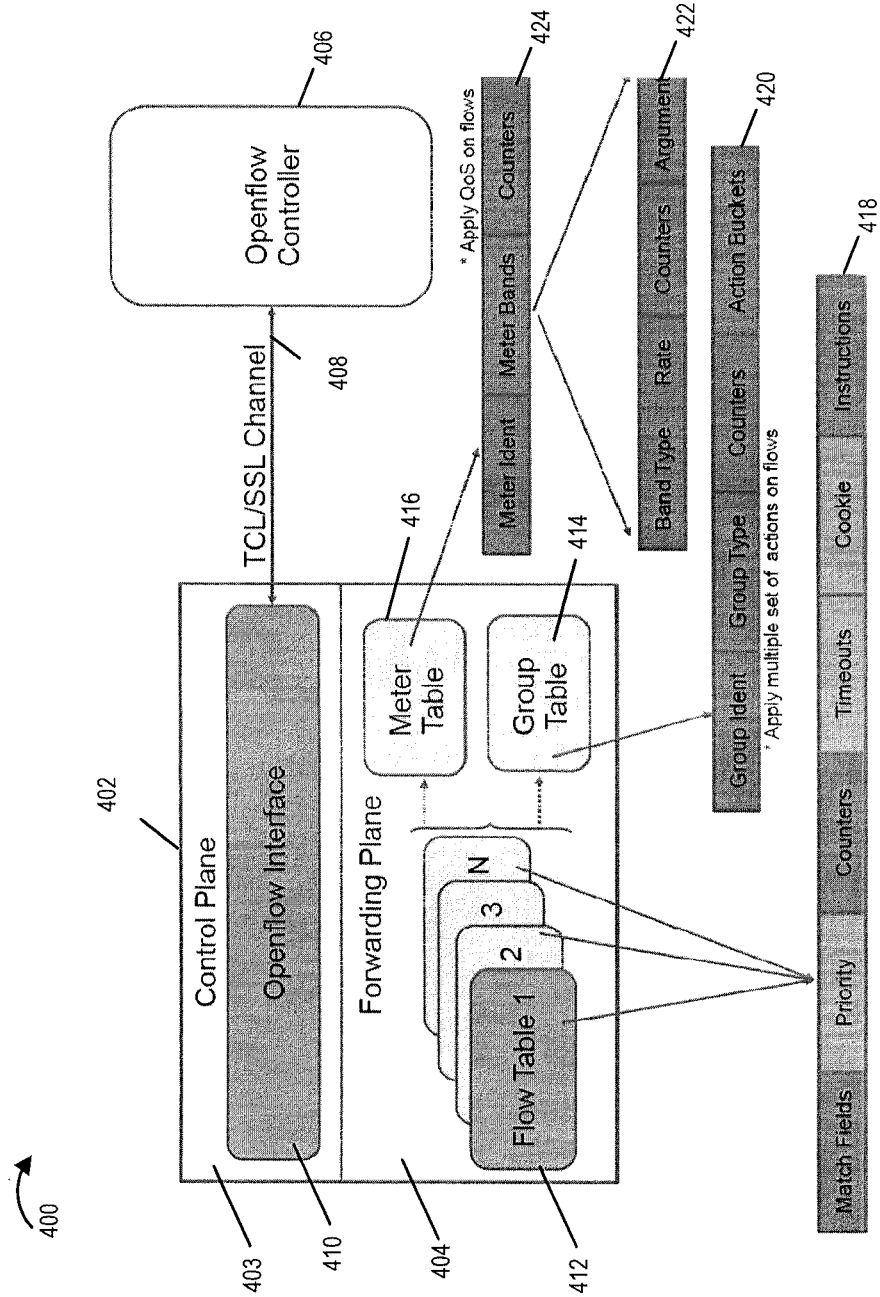
FIG. 4 illustrates an exemplary SDN switch that is an open flow switch along with an open flow controller.

The diagram 400 of FIG. 4 illustrates typical software controlled logical switch data structures namely for an Openflow switch. A description of an open flow switch and the switch's capabilities can be found in the OpenFlow Switch Specification version 1.5.0 (Protocol Version 0x06 published by the Open Networking Foundation dated Dec. 19, 2014.

In diagram 400 the open flow switch 402 illustrated via its logical data structures includes a control plane 403 and a forwarding plane 404. The open flow switch 402 is coupled via an Openflow Interface 410 which is part of the data plane 404 to an external Openflow Controller 406 (e.g., SDN controller 112 of FIG. 1 or 208 of FIG. 2) via a TCL/SSL (TCL/Secure Socket Layer) Channel 408.

The forwarding plane includes a set of flow tables 412 including Flow Table 1, 2, 3, . . . , N; a group table 414 and a meter table 416. Each of the flow tables of the set of flow tables 412 contains a flow entry. The main components of a flow entry in a flow table are shown in element 418. Each flow table entry contains match fields, priority, counters, timeouts, cookie and instructions. A flow entry may also contain flags. As explained in the OpenFlow Switch Specification version 1.5.0 the match fields are used to match against packets. The match fields include the ingress port and packet headers and optionally other pipeline fields such as metadata specified by a previous table. The priority is used for matching the precedence of the flow entry. The counters are updated when packets are matched. The instructions are used to modify the action set or pipeline processing. A flow entry instruction may, and sometimes does, contain actions to be performed on the packet at some point of the pipeline. The set-field action can be used to specify some header fields to rewrite. The timeouts are the maximum amount of time or idle time before flow is expired by the switch. The cookie is an opaque data value chosen by the SDN OpenFlow controller and is sometime used by the SDN controller to filter flow entries affected by flow statistics, flow modification and flow deletion requests. It is not used when processing packets. The flags alter the way flow entries are managed. A flow table entry is uniquely identified by its match fields and priority. The match fields and priority together identify a unique flow entry in a specific flow table.

The Group table 414 of the forwarding plane 404 includes a group of entries. A flow entry in a flow table can point to a group. Each group entry is identified by its group identifier. The main components of the group entry are shown in group entry 420 and include Group Identifier, Group Type, Counters and Action Buckets. These items will be explained in further detail in connection with FIG. 5 which illustrates group table 414 in further detail with group entry 420 further illustrated. The group identifier 502 is integer uniquely identifying the group on the OpenFlow switch, the group type 504 is used to determine group semantics and in this case is set to ALL, the counters 506 are counters which are updated as packets are processed by the group and the action buckets 508, 510, . . . , 512 are an ordered list of action buckets. Each action bucket 508, 510, . . . , 512 includes a set of actions to execute and associated parameters.

The meter table 416 which is part of the forwarding plane is table that consists of meter entries which define per-flow meters which enable the implementation of various simple QoS operations. The main components of a meter entry 424 in the meter table 416 include meter identifier, meter bands and counters. The meter identifier is an integer that uniquely identifies the meter. The meter bands are an unordered list of meter bands with each meter band specifying the rate of the band and the way to process the packet. The counters are counters which are updated as packets are processed by the meter. The main components of a meter band are shown in element 422 and include band type, rate, burst, counters and arguments. The band type defines how a packet is processed the rate is used by the meter to select the meter band. The burst defines the granularity of the meter band. The counters are counters which are updated as packets are processed by a meter band. The meter band entry may also include band type specific arguments.

In some embodiments, the SDN switch, e.g., open flow switch, includes one or more modules or logic that may be implemented in software, hardware, e.g., circuits, or a combination of software and hardware to perform the functionality described herein. In some embodiments, a processor and/or device in the switch performs the functionality described herein in connection with SDN switches.

An exemplary embodiment of the invention will now be described in connection with system 200 and diagram 400. In FIG. 4, RTCP flow entries for each real time stream are added in a Flow Table by the OpenFlow Controller 408 which in connection with system 200 is SDN controller 208. When a RTCP packet is received by the open flow switch (e.g., switch 1 212) it matches a flow entry which as part of instructions can point to a group identifier maintained in the Group table 414. The group table 414 is then used to make one or more copies of the packet matching a RTCP entry. One copy is sent towards the S-SBC 210, e.g., S-SBC VM (virtual machine), while the other copy or original is forwarded to the endpoint or peer (e.g., endpoint B 204).

Figure 5:
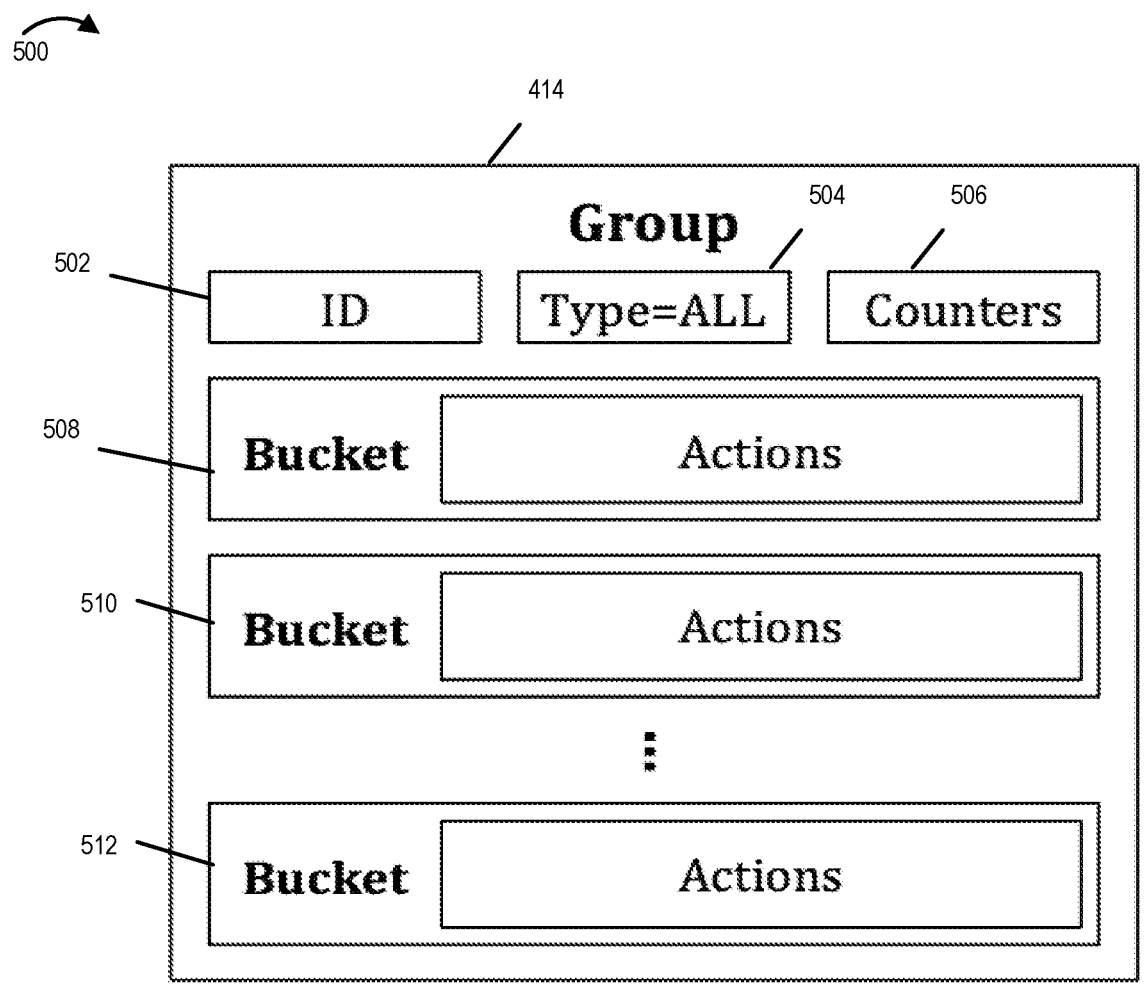
FIG. 5 illustrates components of an exemplary group table of an open flow switch.
Figure 7:
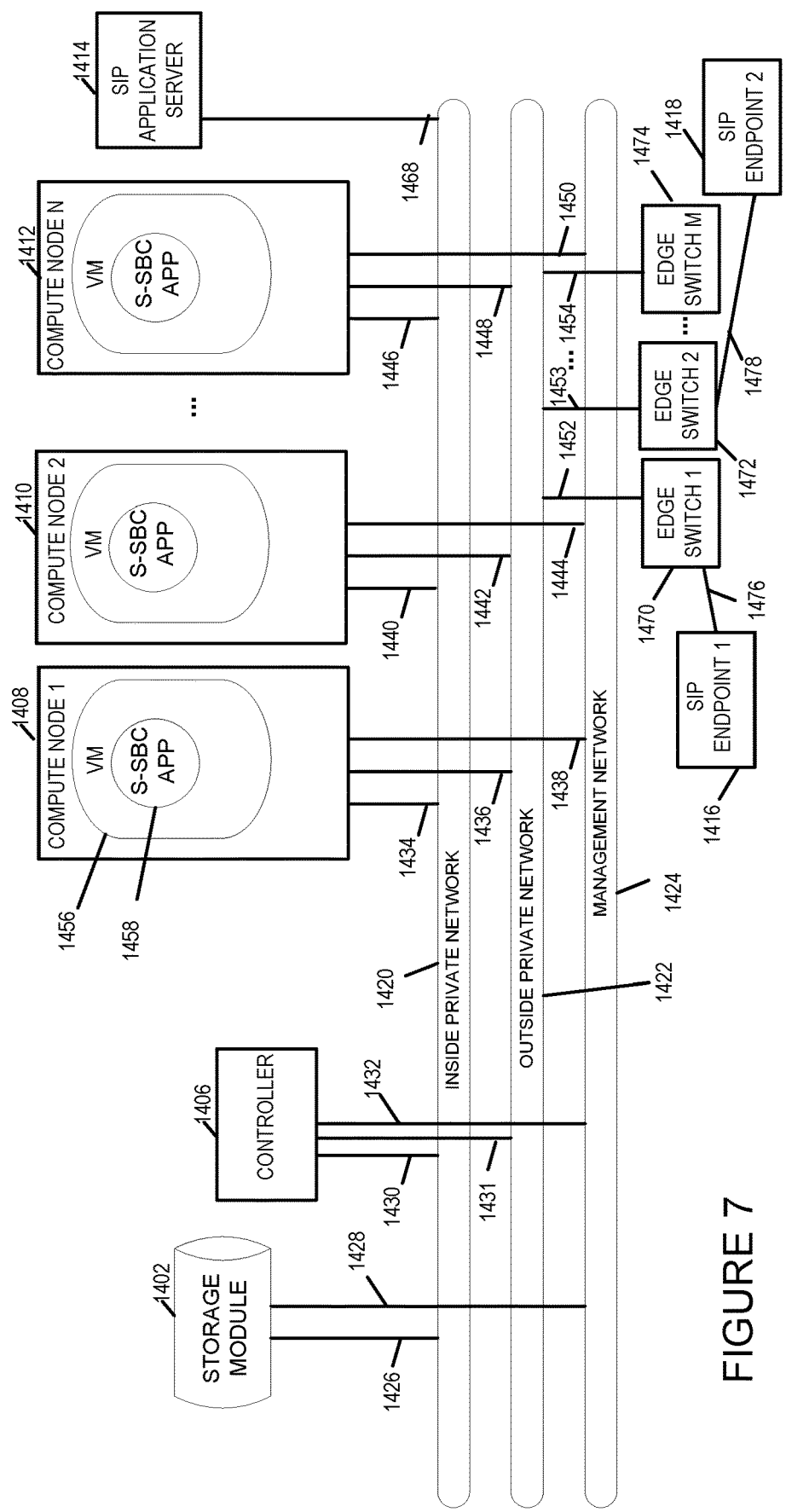
FIG. 7 illustrates an exemplary private cloud system with multiple virtual signaling session border controllers (S-SBCs) in accordance with an embodiment of the present invention.

A typical group table created by the SDN controller 208 is shown in FIG. 5 as described above. The Group ID is associated in each flow entry created for a RTCP packet. A group ID can be created in the group table for a S-SBC, e.g., S-SBC VM instances, by the SDN controller when a S-SBC (e.g., S-SBC VM) registers with the controller or a group of S-SBC instances. While only a single S-SBC 210 is shown in FIG. 2, in some embodiments, a cluster of S-SBCs is used. FIG. 7 described in further detail below illustrates a cloud implementation including a cluster of virtual S-SBCs (S-SBCs VM). In such cases where there is a plurality of S-SBCs, e.g., a cluster of S-SBCs, each of the S-SBCs of the plurality or cluster is assigned a group ID. The group table created for each S-SBC includes two entries. One bucket entry is used to forward the packet normally and other bucket entry is used to forward the packet to the S-SBC (e.g., S-SBC VM instance). For example, an "all" group type 504 with a unique OpenFlow-controller-assigned identifier 502, say, 50 can have two buckets: bucket 1 508 and bucket 2 510. The action associated with bucket 1 508 is to forward the packet normally while the action associated with bucket 2 510 is to modify the destination transport address to be the address of the S-SBC 210 and forward the packet to the S-SBC 210.

Further details of how an exemplary embodiment may be implemented will now be discussed along with a further explanation of how the S-SBC identifies the RTCP stream's session context based on the IP address and port of the S-SBC at which the RTCP stream is received or from information in the RTCP message itself.

When Peer A (e.g., Endpoint device A 202 (ingress peer) sends a SIP INVITE message including an SDP offer message, the SDP offer message from Peer A contains the IP-Address and port number of Peer A on which Peer A would like to receive/send RTP/RTCP packets (e.g., SDP offer message c line, UDP/RTP port, RTP+1 used for RTCP port). In this example, this will be IP-A and Port A. On receipt of a SIP INVITE message with an SDP message from Peer A, SBC acts like a B2BUA (Back-to-Back User Agent) and forwards the SIP INVITE towards egress Peer B (Endpoint Device B 204). While forwarding the SIP INVITE message, the SBC changes the media-ports to point to itself in the egress SDP offer. In this example, the SBC changes the SDP offer message changes the media-ports to point to IP-SBC-E and Port E. The egress Peer B responds with a SIP 200 OK with an SDP Answer message and the SDP answer message from Peer B contains the IP-Address and port number of Peer B on which Peer B would like to receive/send RTP/RTCP packets (e.g., SDP answer message c-line and UDP/RTP port, RTP+1 shall be used for RTCP port). In this example, the IP-Address and port number of Peer B on which Peer B would like to receive/send RTP/RTCP packets are IP-B and Port B. Now, SBC (continues to) act(s) as a B2BUA and forwards the SIP 200 OK message towards egress Peer A. While forwarding the SIP 200 OK message, SBC changes the media-ports to point to itself in the SDP answer message (sent towards Peer A). In this example, the SBC 210 changes the IP address and port from IP-B and Port B to IP-SBC-I and Port I.

At the end of SDP offer-answer exchange, the media-flow is as follows:

Peer A sends a RTP/RTCP packet with IP-A and Port A(+1) as origination IP address and destination IP address as IP-SBC-I and Port I(+1). (The origination IP address points to Peer A (endpoint device A 202) and the destination IP address points to SBC).

SBC performs topology hiding and forwards the RTP/RTCP packet towards egress Peer B (Endpoint Device B 204).

SBC sends a RTP/RTCP packet with IP-SBC-E and Port E(+1) as origination IP address and destination IP address as IP-B and Port B(+1). (The origination IP address points to SBC and the destination IP address points to Egress Peer B (Endpoint Device 204).

It should be noted that the RTCP packet is typically sent on a port which is one higher than that of a corresponding RTP packet.

In an SDN enabled environment, instead of media packets reaching all the way to media-component of the SBC (M-SBC), the signaling component of SBC (e.g., S-SBC 210) installs rules (via SDN controller 208) in SDN-enabled switches to perform the topology hiding as described above i.e. Origination/Destination IP-address/ports are re-written at SDN-enabled switches directly. The modified RTP/RTCP packets are directly sent towards Peer B. It shall also be noted that the manipulation is per-session specific for example, for a session between a Peer C and a Peer D, the modifications of the IP-addresses would be based on the SDP offer-answer exchange on that session. In summary, signaling component of the SBC (S-SBC), based on the SDP offer-answer exchange, installs rules (via SDN controller) in the SDN-enabled switches to re-write/manipulate IP addresses/port of RTP/RTCP packets on a per-session basis to perform topology hiding. This has to be done for both RTP and RTCP packets. The ability to use SDN-enabled switches to perform topology hiding is a highly advantageous for operators so that they don't need to backhaul media traffic to the SBC. It should also be noted that the above rule is uni-directional. To perform topology hiding in the reverse direction, a second rule is installed to do reverse manipulation (for both RTP and RTCP packets). In total 4 rules are installed—for RTP and RTCP packets in both directions.

In order to still analyze RTCP packets for QoS and other purposes described herein while routing RTP/RTCP packets directly between peer(s) involved in a call or media session, the signaling component of SBC (S-SBC) installs a group table that has two buckets/rules—a) the first rule doing IP-address/port re-writing/manipulations to perform topology hiding (as described above) b) the second rule doing the forking of IP packet i.e. the ingress RTCP packet is duplicated to a different destination (S-SBC in this case). The S-SBC address here points to a given IP-address and port. A similar group table is created to duplicate RTCP packet(s) coming from the other direction.

When the RTCP packet is duplicated, it is sent towards the S-SBC's IP-address and port. There are multiple mechanisms by which the S-SBC can map the received RTCP packet to a given ongoing session. Two of these mechanisms are discussed below.

In the first mechanism, when the "packet duplication" rule is installed, the destination address is configured to point to a S-SBC's IP address and a dynamic port (that S-SBC allocates on a per-session basis). When the duplicated RTCP packet is received, the "port" on which it is received itself directly maps to an ongoing session. For example, for a media session between Peer A and Peer B (in that direction), S-SBC IP address and port A1 is allocated and configured as the destination for the duplicated RTCP packet. When the duplicated RTCP packet is received on port A1, it directly maps to a session between Peer A and Peer B (in that direction). For a media session between Peer B and Peer A (in that direction), S-SBC IP address and port A2 is allocated and configured as the destination for the duplicated RTCP packet. When the duplicated RTCP packet is received on port A2, it directly maps to a session between Peer B and Peer A (in that direction). S-SBC uses the information in the RTCP packet to calculate QoS/QoE metrics for that specific session.

In the second mechanism, when the "packet duplication" rule is installed, the destination address is configured to point to a S-SBC's IP address and a static port. When the duplicated RTCP packet is received, S-SBC inspects the RTCP packet and based on the origination IP address of the IP packet, i.e. peer's IP address, the ongoing session can be fetched based on peer's IP address. For example, if the origination IP-address is IP-A and Port A, it maps to the ongoing to session between Peer A and Peer B in that direction. If the origination IP-address is IP-B and Port B, it maps to the ongoing to session between Peer B and Peer A in that direction. S-SBC uses the information in the RTCP packet to calculate QoS/QoE metrics for that specific session.

The S-SBC (e.g., S-SBC 210) receives the forwarded RTCP packets for the media session or call. These RTCP packets contain reports in the form of RR (Receiver Report)/SR (Sender Report) or XR (X-tended Report). These reports may be, and in some embodiments are, used by the S-SBC for each RTP stream to get an insight into the quality of experience/service experienced by the user. Some of the RTCP fields that are of importance and in some embodiments are used by the S-SBC to generate QoS and/or QoE metrics and/or are collected as QoS or QoE metrics or network information metrics are: (i) cumulative number of packets lost, (ii) xtended highest sequence number received, (iii) fraction lost, (iv) inter-arrival jitter, (v) delay since last SR (DLSR).

Some of the QoS and/or QoE metrics that are generated by the S-SBC (that receives the collected information from the RTCP fields) are: R-Factor, MoS score, Packet Loss and Discard Metrics, Burst Metrics, Delay Metrics, Signal Related Metrics, Call Quality or Transmission Quality Metrics, and/or Jitter Buffer Parameters.

As part of establishing the media session, the S-SBC 210 sends the following information to the SDN controller 208:

(1) 5-tuple information of each of the streams (RTP and RTCP) for Peer-1 (endpoint A 202) to SBC inside interface (i.e., the SBC IP network interface facing peer-1 and to which peer-1 sends media packets) representing unique flow (2) with its appropriate bandwidth requirements, including VLAN tag and DSCP, if any.

(2) 5-tuple information of each of the streams (RTP and RTCP) for Peer-2 (endpoint B 204) to SBC outside interface (i.e., the SBC IP network interface facing peer-2 to which peer-2 sends media packets representing unique flow (2) with its appropriate bandwidth requirements, including VLAN tag, DSCP if any.

(3) as part of the flow treatment primitive
    an IP address modification primitive to modify the 5 tuple for a packet coming from peer-1 (endpoint A) and to be sent to peer-2 (endpoint B).
    Group ID to be associated with the flow table—which is used for forking RTCP packet.

As part of configuring the SDN network for the media session, the SDN controller 208 performs the following tasks so that open flow switch forks the RTCP stream and sends a copy to the S-SBC 210.

The SDN controller based on it topology manager and path computation modules identifies peer-1 (endpoint A 202) and peer-2 (endpoint B 204) are connected to which of the underlying openflow switches. The SDN controller then identifies the shortest and the most optimal path (based on bandwidth need of the flow and sends instructions to the open flow switch). Both the flows may be present on the same open flow switch. Standard Open Flow messages (as defined in Open Flow Specification v1.3 and beyond) are used to specify a flow entry (carrying 5 tuple information, including modify primitive to update the tuple information (from IP-A and Port A, IP-SBC-I and Port I to IP-B and Port B and IP-SBC-E and Port E). Based on the bandwidth requirement the SDN controller 208 also specifies to the open flow switch which meter entry is required to be associated to the flow entry. This results in the flows to be policed as per the meter rate. The meter tables are pre-configured based on the codec rate(s) supported by the SBC as part of instantiation. The group table entries in the open flow switches are configured based on SBC packet duplication logic discussed above. It can be either predefined or specified as part of the call.

Figure 3:
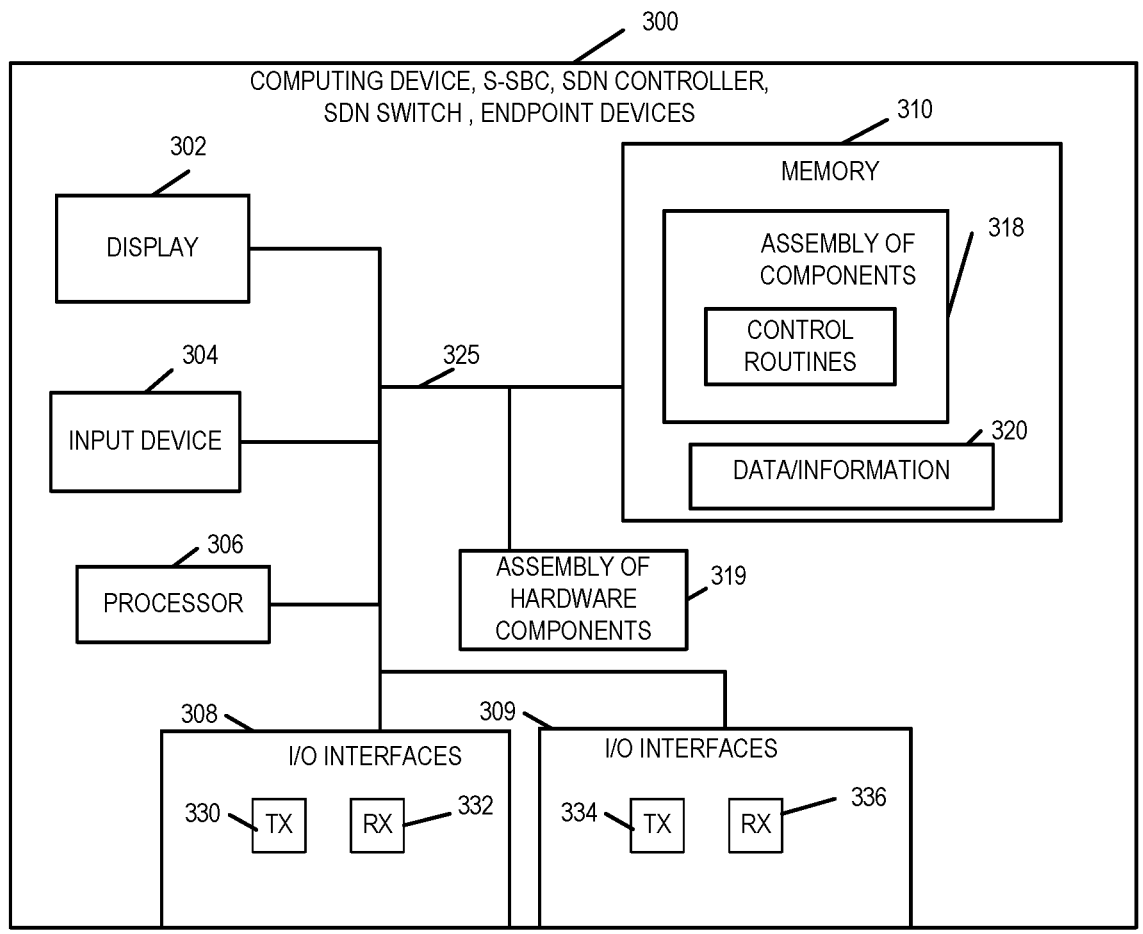
FIG. 3 illustrates an exemplary computing device in accordance with an embodiment of the present invention.

FIG. 3 illustrates a computing device 300 which may be used to implement an S-SBC, edge switch, SDN switch, an open flow switch, SDN controller or core switch in one or more embodiments of the present invention. In one embodiment, the S-SBC is implemented in the cloud as an S-SBC application on compute node.

FIG. 3 illustrates an exemplary computing device 300, e.g., a SIP processing device, a signaling Session Border Controller (S-SBC), Endpoint device, peer device, SDN controller, or SDN switch, e.g., open flow switch, in accordance with an embodiment of the present invention. Exemplary computing device 300 includes an optional display 302, an input device 304, a processor 306, e.g., a CPU, I/O interfaces 308 and 309, which couple the computing device to networks or communications links and/or various other devices, memory 310, and an assembly of components 319, e.g., circuits corresponding to different components, coupled together via a bus 325 over which the various elements may interchange data and information. Memory 310 includes an assembly of components 318, e.g., an assembly of software components, and data/information 320. The assembly of software components 318 includes a control routines component which includes software instruction which when processed by processor 306 control the operation of the computing device to perform various functions and/or one or more steps of the various method embodiments of the invention. The I/O interface 308 includes transmitters 330 and receivers 332. The I/O interface 309 includes transmitters 334 and receivers 336. The computing device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), User Datagram Protocol (UDP), Session Initiation Protocol (SIP), Session Description Protocol (SDP), Real-time Transport Protocol (RTP), and RTP Control Protocol (RTCP). In some embodiments, the computing device 300 includes a communication component configured to operate using IP, TCP, UDP and SIP protocol signaling methods. In some embodiments, the communications component is a hardware component, a software component or a component including hardware and software components. In some embodiments the computing device is configured to use different protocols such as the Open Flow protocol and REST protocols.

FIG. 7 illustrates an exemplary private cloud system 1400 with multiple virtual signaling session border controllers (S-SBCs) in accordance with an embodiment of the present invention. The exemplary cloud system 100 shown is a private cloud but the system may be, and in many embodiments is, implemented in a public cloud. While only signaling S-SBCs are shown in the figure, additional compute nodes may include media relay and interworking network elements namely T-SBCs and M-SBCs in the cloud network. The M-SBCs would be included for example when there are certain media services like SRTP, lawful interception to be provided that cannot be provided by OF-enabled switches. The system includes physical hardware resources including computing, storage, and network that provide processing, storage and connectivity which will be described in further detail below. The computing hardware includes one or more processors and commercial off the shelf (COTS) hardware that is commonly pooled. In some embodiments, the computing hardware is specialized and configured for use as session border controllers.

The system includes a storage module 1402, a controller 1406, a plurality of compute nodes, an optional SIP application server 1414, a SIP endpoint device 1 1416, a SIP endpoint device 2 1418, an inside private communications network 1420, an outside private communications network 1422, a plurality of SDN edge switches including Open Flow Edge Switch 1 1470, Open Flow Edge Switch 2 1472, . . . , Open Flow Edge Switch M 1474 (where M is a positive integer), a management network 1424, and a plurality of communications links 1426, 1428, 1430, 1431, 1432, 1434, 1436, 1438, 1440, 1442, 1444, 1446, 1448, 1450, 1452, 1454, 1468, 1476, and 1478. The inside private communications network 1420, the outside private communications network 1422, the management network 1424, and the plurality of communications links 1426, 1428, 1430, 1432, 1434, 1436, 1438, 1440, 1442, 1444, 1446, 1448, 1450, 1452, 1453, 1454, 1468, 1476 and 1478 are used to exchange messages, information and instructions between the various devices, endpoints, nodes and entities in the system.

The plurality of compute nodes includes a compute node 1 1408, a compute node 2 1410, . . . , a compute node N 1412 where N is a positive number. The compute node 1 includes a virtual machine 1456 and a signaling session border controller (S-SBC) application 1458. A compute node running a signaling session border controller application, e.g., S-SBC APP 1458, is a virtualized signaling-session border controller. Each of the compute nodes 2 1410, . . . , N 1412 include a virtual machine and a SBC application. The SBC application can be a S-SBC, a M-SBC or a T-SBC. When all of the SBC applications are S-SBCs, the plurality of compute nodes 1 . . . N executing software instructions to operate as a signaling session border controller form a cluster of N computing devices or SIP processing devices. When N=5, it forms a cluster of five virtual signaling session border controllers. The resources, e.g., SIP processing capabilities, available to each of the virtual signaling session border controllers may be, and typically is, different, for example based on how the virtual S-SBC is configured. The compute node 1 1408 is coupled to: the inside private network 1420 via communication link 1434, the outside private network 1422 via communications link 1436, and the management network 1424 via communications link 1438. The communications node 2 1410 is coupled to: the inside private network 1420 via communication link 1440, the outside private network 1422 via communications link 1442, and the management network 1424 via communications link 1444. The communications node N 1412 is coupled to: the inside private network 1420 via communication link 1446, the outside private network 1422 via communications link 1448, and the management network 1424 via communications link 1450.

The storage module 1402 is a storage device, e.g., memory, for storing instructions, information and data. The storage module 1402 is coupled to the inside private network 1420 via communications link 1426 and to the management network 1424 via communications network 1428.

The controller 1406 operates to configure and manage the private cloud system. The controller 1406 performs the functions of the SDN controller. The controller 1406 is coupled to the inside private network 1420 via communications link 1430 over which it communicates with the S-SBCs and can get the flow requests from the S-SBCs, the outside private network 1422 via communications link 1431 over which it communicates and sends instructions to the switches, e.g., edge switches 1470, 1472, . . . , 1474, and the management network 1424 via communications link 1432 for operational purposes such as performing and communicating management functions. In some embodiments, the controller includes an orchestrator device or module, a Virtual Network Function manager device or module, and an element management system device or module. The orchestrator controls the orchestration and management of network function virtualized infrastructure and software resources, and realizing network services on network function virtualized infrastructure. The Virtual Network Function manager device or module operates to control virtual network function lifecycle management including for example instantiation, update, query and termination. A virtual network function as described in the ETSI GS NFV 002 V1.1.1 is a virtualisation of a network function. In this example, the virtualized network functions are session border controllers. The element management system or module performs management functions for one or several of the virtual network functions, e.g., virtual SBCs. Each compute node includes one or more processors. In some embodiments, one or more of the compute nodes in the system include a single processor upon which multiple virtual SBCs, e.g., S-SBCs, of the cluster are instantiated. In some embodiments, each virtual SBC, e.g., S-SBC, of the cluster is a set of programming instructions forming a SBC, e.g., S-SBC, application which is executed on a processor of a compute node.

The SIP application server 1414 is coupled to the inside private network 4120 via communications link 1468.

The Edge Switch 1 1470, Edge Switch 2 1472, . . . , Edge Switch M are coupled to the outside private network 1422 via communications links 1452, 1453, . . . 1454 respectively.

The SIP Endpoint device 1 1416 is coupled to the outside private network 1422 via communications link 1476, Edge Switch 1 1470 and communications link 1452. The SIP Endpoint 2 1418 is coupled to the outside private network 1422 via communications link 1478, Edge Switch 2 1472 and communications link 1453. In some embodiments, the system 1400 also includes a DNS server.

The methods and steps described in connection with the SBCs, e.g., S-SBCs, may also be implemented on the private cloud system 1400 of FIG. 7.

Figure 8A:
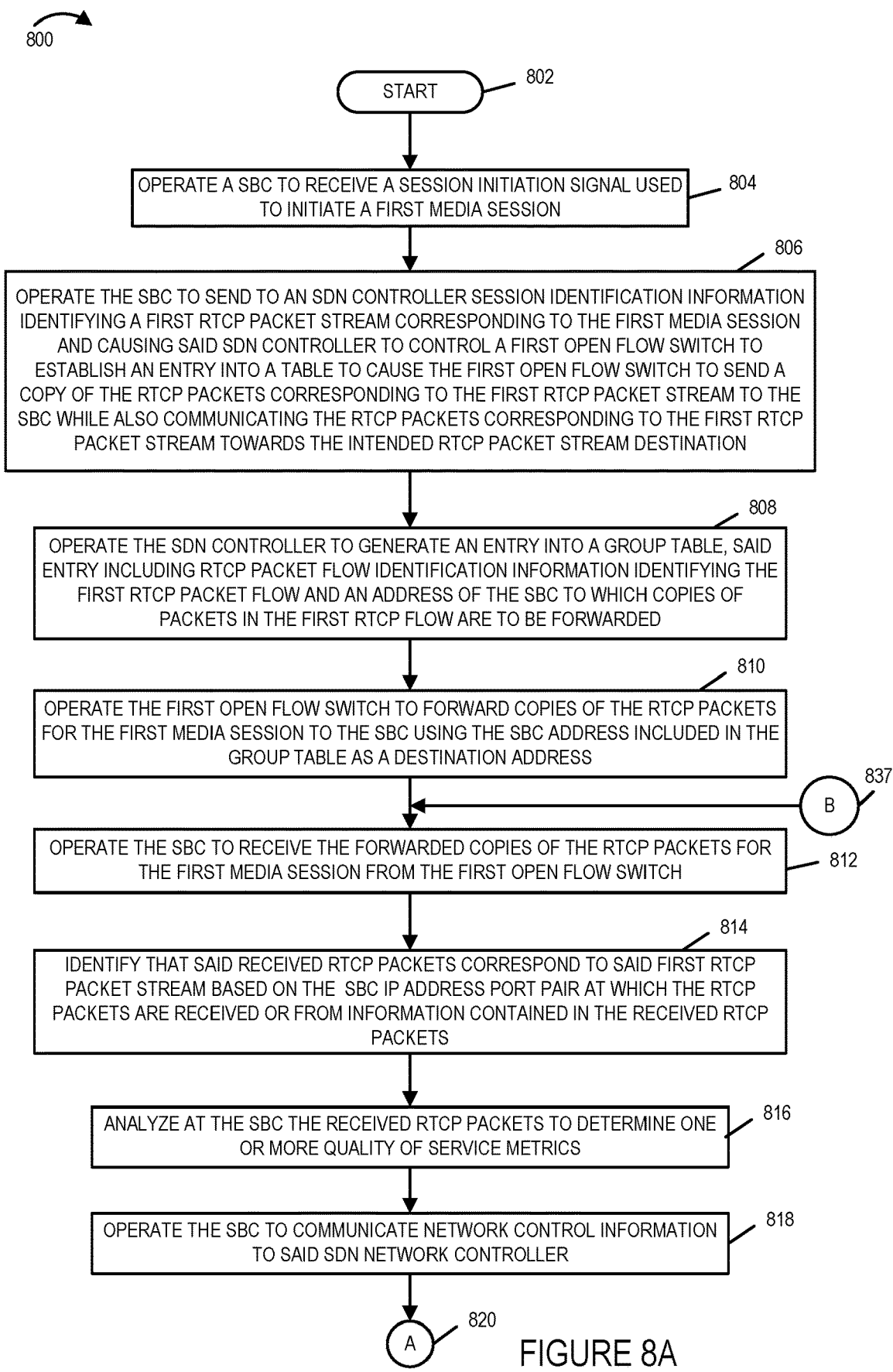
FIG. 8A illustrates a first part of a flowchart of an exemplary method in accordance with an embodiment of the present invention.

FIG. 8, comprising the combination of FIG. 8A and FIG. 8B, is a flowchart 800 of an exemplary communications method in accordance with an exemplary embodiment. The exemplary method 800 may be, and in some embodiments is implemented on system 100 of FIG. 1, the system 200 of FIG. 2, and the system 1400 of FIG. 7. For purposes of explaining exemplary method 800 described below with respect to system 200, the SBC is S-SBC 210, the SDN controller is SDN controller 208, the first open flow switch is switch 1 212. The first media session is established between Endpoint device A 202 and Endpoint device B 204. The origination of the RTCP packets of the first RTCP packet stream is Endpoint device A 202 with a destination of the S-SBC 210 media IP address towards Endpoint A 202 as part of the communication of the RTCP packets from Endpoint device A 202 to the Endpoint device B 204. In some embodiments, the origination of the RTCP packets of the first RTCP packet stream is Endpoint device B 204 with a destination of the S-SBC 210 media IP address towards Endpoint device B 204 as part of the communication of the RTCP packets from Endpoint device B 204 to the Endpoint device A 202.

Operation starts in step 802 in which the communications system is powered on and initialized. Operation proceeds from step 802 to step 804. In step 804, an SBC, e.g., S-SBC 134 in system 100 of FIG. 1, S-SBC 210 of system 200 of FIG. 2, or S-SBC 1408 of system 1400 of FIG. 7, is operated to receive a session initiation signal used to initiate a first media session. Operation proceeds from step 804 to step 806.

In step 806 the S-SBC, is operated to send an SDN controller (e.g., SDN controller 112 of system 100 of FIG. 1, SDN controller 208 of system 200 of FIG. 2, or SDN controller 1406 of FIG. 7) session identification information identifying a first RTCP packet steam corresponding to the first media session and causing said SDN controller to control a first open flow switch to establish an entry into a table to cause the first open flow switch to send a copy of the RTCP packets corresponding to the first RTCP packet stream to the SBC while also communicating, e.g., forwarding, the RTCP packets corresponding to the first RTCP packet stream toward the intended RTCP packet stream destination i.e. the other party in the session. In some embodiments, the session identification information is 5 tuple information including: source IP address, source transport port, protocol type, destination IP address and destination transport port. In some embodiments, the SBC learns the session identification information identifying the first RTCP packet stream corresponding to the first media stream based on information included/exchanged in an SDP Offer-Answer exchange with a first peer device. The SDP offer and answer messages being incorporated in SIP messages passing through the SBC during session establishment. Operation proceeds from step 806 to step 808.

In step 808 the SDN controller is operated to generate an entry into a group table, said entry including RTCP packet flow identification information identifying the first RTCP packet flow and an address of the SBC to which copies of the packets in the first RTCP flow are to be forwarded. For example with respect to system 100 in which a media session is established between endpoint 1 102 and endpoint 2 104, the SDN 112 generates an entry in the group table of edge switch 1 which includes information that identifies the RTCP packets of a RTCP packet flow being sent from Endpoint device 1 102 with a destination of SBC's IP address facing towards Endpoint 1 to be used when communicating RTCP packets from Endpoint 1 to Endpoint device 2 104 and also an address for S-SBC 134 to which copies of the packets in the RTCP flow are to be forwarded.

In some embodiments, the group table is in an Open-Flow controlled switch (e.g., open flow switch 106 of FIG. 1 or open flow switch 212 of FIG. 2). In some embodiments, said entry contains a first bucket (e.g., bucket 508) and a second bucket (e.g., 510), said first bucket containing instructions to copy the packets of the first RTCP packet flow and forward the packets toward the SBC (e.g., S-SBC 134 of system 100, S-SBC 210 of system 200, S-SBC 1458 of system 1400, said second bucket containing instructions to forward the packets of the first RTCP flow toward the identified RTCP packet stream destination, e.g., other peer (e.g., Endpoint device 2 104 of system 100, Endpoint device B 204 of system 200, or SIP endpoint 2 1418 of system 1400 assuming the RTCP packets are being sent from Endpoint device 102 to Endpoint device 104 in system 100, from Endpoint device A 202 to Endpoint device B 204 in system 200 and from SIP endpoint 1 1416 to SIP endpoint 2 1418 in system 1400 respectively) after performing topology hiding. Operation proceeds from step 808 to step 810.

In step 810 the first open flow switch is operated to forward copies of the RTCP packets for the first media session to the S-SBC using the SBC address included in the group table as a destination address. Operation proceeds from step 810 to step 812.

In step 812 the S-SBC is operated to receive the forwarded copies of the RTCP packets for the first media session from the first open flow switch. Operation proceeds from step 812 to step 814.

In step 814 the S-SBC identifies that the received RTCP packets correspond to said first RTCP packet stream based on the SBC IP address port pair at which the RTCP packets are received or from information contained in the received RTCP packets. Operation proceeds from step 814 to step 816.

In step 816 the SBC analyzes the received RTCP packets to determine one or more quality of service metrics. Operation proceeds from step 816 to step 818.

In step 818 the SBC is operated to communicate network control information to said SDN network controller. In various embodiments, the network control information includes at least one or one or more Quality of Service (QoS) metrics. In some embodiments, the network control information includes a subset of Quality of Service metrics determined by analyzing the received RTCP packets. In some embodiments, the network control information includes all of the Quality of Service metrics determined by analyzing the received RTPC packets over a specified time period. In some embodiments, the network control information includes an indication that a Quality of Service level specified for the media session is not being met. In various embodiments, the one or more Quality of Service metrics includes at least one of the following: R-Factor, network-packet loss, or packets discarded due to jitter. Operation proceeds from step 818, via connecting node A 820, to step 822. In step 822, the SDN controller is operated to receive said network control information. In some embodiments, operation proceeds from step 822 to step 824. In some embodiments, operation proceeds from step 822 to step 825, in which the SDN controller communicates the network control information to a routing engine for use in making future network routing decisions. In some embodiments, the SBC communicates the network control information to a routing engine for use in making future network routing decisions. In some embodiments, both the SDN controller and the SBC communicate network control information to a routing engine for use in making future network routing decisions.

Returning to step 824, in step 824 the SDN controller analyzes said network control information. Operation proceeds from step 824 to step 826. In step 826 the SDN controller stores or logs the RTCP information into one or more call data records. Operation proceeds from step 826 to step 828.

In step 828 the SDN controller is operated to determine if a condition has been satisfied. Step 828 includes steps 830, 832 and 834. In step 830 the SDN controller determines if a QoS level has not been met for said first media session based on said network control information.

If the determination of step 830 is that a QoS level has not been met for said first media session based on said network control information, then operation proceeds from step 830 to step 832 in which the SDN controller determines that the condition has been satisfied. However, if the determination of step 830 is that a QoS level has been met, e.g., for each of the QoS metrics being evaluated, for said first media session based on said network control information, then operation proceeds from step 830 to step 834 in which the SDN controller determines that the condition has not been satisfied. Operation proceeds from step 828 to step 836.

In some embodiments, the SDN controller determines that a QoS level has not been met for said first media session when said network control information includes an indication that a QoS level has not been met for the first media session. In some such embodiments, said indication that a QoS level has not been met in network control information is a flag that is set and the network control information further includes session identification information. Thus, in some embodiments, step 830 includes checking the status of a flag in the network control information. In some embodiments, step 830 includes checking a plurality of flags in the network control information, e.g., one flag corresponding to each quality of service metric being tested.

In step 836 the SDN controller controls operation as a function of the determination as to whether or not the condition has been satisfied. If the determination of step 828 is that the condition has been satisfied, then operation proceeds from step 836 to step 838; otherwise, operation proceeds from step 836, via connecting node B 837 to step 812, where the SBC is operated to receive more forwarded copies of the RTCP packets for the first media session from the first open flow switch.

Returning to step 838, in step 838 the SDN controller is operated to: i) indicate to the first open flow switch a new priority level for the RTP packets of the first media session, ii) control at least one switch to alter a path for the first media session, or iii) control at least one switch to alter a path for a second media session to alleviate a detected quality of service problem based on the received network control information, e.g., redirect second media session RTP packets so that it is no longer flowing through the first open switch thereby providing additional first switch bandwidth to the first media session. Operation proceeds from step 838 to step 840.

In step 840 the SDN controller determines network routing paths in response to new media session requests which optimize network bandwidth utilization based on the received network control information. Operation proceeds from step 840 to step 842.

In step 842 the SDN controller sends to one or more open flow switches commands to implement the determined network routing paths. Operation proceeds from step 842 to step 844. In step 844 the one or more open flow switches are operated to implement received routing commands. Processing proceeds from step 844 via connection node 837 to step 812 where the SBC is operated to receive more forwarded copies of the RTCP packets for the first media session from the first open flow switch and the method continues as previously described.

In some embodiments, the RTP packets of the first media session are sent to the SBC. In some embodiments, the RTP packets of the first media session do not pass through the SBC. In SDN systems, the RTP packets of the first media session do not pass through the SDN controller.

In various embodiments, the SBC is a signaling SBC (S-SBC). In some such embodiments, the SBC and the SDN controller communicate using a Representation State Protocol (REST) or a proprietary protocol. In some embodiments, said SDN controller and said first open flow switch communicate using Open Flow protocol.

Set forth below are various exemplary numbered embodiments. Each set of numbered exemplary embodiments is numbered by itself with embodiments in a set referring to previous numbered embodiments in the same set.

List of Set of Exemplary Numbered Method Embodiments

Method Embodiment 1. A communications method, the method comprising: operating a session border controller (SBC) to receive a session initiation signal used to initiate a first media session; operating the SBC to send to an SDN controller session identification information (5 tuple information—source IP address, source transport port, protocol type, destination IP address, destination transport port) identifying a first RTCP packet stream corresponding to the first media session and causing said SDN controller to control a first open flow switch to establish an entry in a table to cause the first open flow switch to send a copy of the RTCP packets corresponding to the first RTCP packet stream to the SBC while also communicating (e.g., forwarding) the RTCP packets corresponding to the first RTCP packet stream towards the intended first RTCP packet stream destination.

Method Embodiment 2. The method of method embodiment 1, wherein said SBC learns the session identification information identifying the first RTCP packet stream corresponding to the first media stream based on information included in an SDP Offer-Answer exchange with a first peer device.

Method Embodiment 3. The method of method embodiment 1 further comprising: operating the SBC to send the SDN controller session identification information identifying a second RTCP packet stream corresponding to the first media session and causing said SDN controller to control said first open flow switch to establish an entry in a table to cause the first open flow switch to send a copy of the RTCP packets corresponding to the second RTCP packet stream to the SBC while also communicating (e.g., forwarding) the RTCP packets corresponding to the second RTCP packet stream towards the intended second RTCP packet stream destination.

Method Embodiment 4. The method of method embodiment 1 wherein said second RTCP packet stream destination (e.g., Endpoint device 1) is different from said first RTCP packet stream destination (Endpoint device 2).

Method Embodiment 5. The communications method of method embodiment 1, further comprising: operating the SDN controller to generate an entry in a group table, said entry including RTCP packet flow identification information identifying the first RTCP packet flow and an address of the SBC to which copies of packets in the first RTCP flow are to be forwarded.

Method Embodiment 6. The communications method of method embodiment 5, wherein said group table is in an Open-Flow controlled switch.

Method Embodiment 7. The communications method of method embodiment 5, wherein said entry contains a first bucket and a second bucket, said first bucket containing instructions to copy the packets of the first RTCP packet flow and forward said packets toward the SBC, said second bucket containing instructions to forward the packets of the first RTCP flow toward the intended RTCP packet stream destination, e.g., other peer, after performing topology hiding.

Method Embodiment 8. The communications method of method embodiment 5, further comprising: operating the first open flow switch to forward copies of the RTCP packets for the first media session to the SBC using the SBC address included in the group table as a destination address.

Method Embodiment 9. The method of method embodiment 8, further comprising: operating the SBC to receive the forwarded copies of the RTCP packets for the first media session from the first open flow switch; identifying that said received RTCP packets correspond to said first RTCP stream based on the SBC IP address port pair at which the RTCP packets are received or from information contained in the received RTCP packets (5 Tuple); analyzing at the SBC the received RTCP packets to determine one or more Quality of Service (Qos) metrics; and operating the SBC to communicate network control information to said SDN network controller.

Method Embodiment 10. The method of method embodiment 9 wherein the network control information includes at least one of one or more Quality of Service metrics.

Method Embodiment 11. The method of method embodiment 9 wherein the network control information includes a subset of the Quality of Service metrics determined by analyzing the received RTCP packets.

Method Embodiment 12. The method of method embodiment 9 wherein the network control information includes all of the Quality of Service metrics determined by analyzing the received RTCP packets over a specified time period.

Method Embodiment 13. The method of method embodiment 9 wherein the network control information includes an indication that a Quality of Service level specified for the media session is not being met.

Method Embodiment 14. The method of method embodiment 9 wherein the one or more Quality of Service metrics includes at least one of the following: R-Factor, network-packet loss, or packets discarded due to jitter.

Method Embodiment 15. The method of method embodiment 9 further comprising: operating the SDN controller to receive said network control information; analyzing by the SDN controller said network control information; and when said SDN controller determines that a condition has been satisfied operating the SDN controller to: i) indicate to the first open flow switch a new priority level for the RTP packets of the first media session, ii) control at least one switch to alter a path for the first media session, or iii) control at least one switch to alter a path for a second media session to alleviate a detected Quality of Service problem based on said received network control information (e.g., redirect second media session RTP packets so that it is no longer flowing through the first open flow switch thereby providing additional first switch bandwidth to the first media session).

Method Embodiment 16. The method of method embodiment 15 wherein said SDN controller determines that said condition has been satisfied when the SDN controller determines that a QoS level has not been met for said first media session based on said network control information.

Method Embodiment 17. The method of method embodiment 16 wherein said SDN controller determines that a QoS level has not been met for said first media session when said network control information includes an indication that a QoS level has not been met for said first media session.

Method Embodiment 18. The method of method embodiment 17 wherein said indication that a QoS level has not been met in said network control information is a flag that is set and wherein said network control information further includes said session identification information.

Method Embodiment 19. The method of method embodiment 15 further comprising: determining, by the SDN controller, network routing paths in response to new media session requests which optimize network bandwidth utilization based on the received network control information.

Method Embodiment 20. The method of method embodiment 1 wherein the RTP packets of the first media session are not sent to the SBC.

Method Embodiment 21. The method of method embodiment 1 wherein the RTP packets of the first media session do not pass through the SBC.

Method Embodiment 22. The method of method embodiment 21 wherein the RTP packets of the first media session do not pass through said SDN controller.

Method Embodiment 23. The method of method embodiment 21 wherein the SBC is a signaling SBC (S-SBC).

Method Embodiment 24. The method of method embodiment 23 wherein the SBC and SDN controller communicate using a Representation State Protocol (REST) or a proprietary protocol.

Method Embodiment 25. The method of method embodiment 1 wherein said SDN controller and said first open flow switch communicate using Open Flow protocol.

Method Embodiment 26. The method of method embodiment 9 further comprising: operating the SBC to store or log the RTCP information into one or more Call Data Records.

Method Embodiment 27. The method of method embodiment 9 further comprising: operating the SBC to communicate QoS information to a routing engine for use in making future network routing decisions.

List of Set of Exemplary Numbered System Embodiments

System Embodiment 1. A communications system comprising: a first open flow switch; a Software Defined Network (SDN) controller; and a session border controller (SBC), said SBC including: memory; and a processor that controls the SBC to: receive a session initiation signal used to initiate a first media session; and send to the SDN controller session identification information (5 tuple information—source IP address, source transport port, protocol type, destination IP address, destination transport port) identifying a first RTCP packet stream corresponding to the first media session and causing said SDN controller to control the first open flow switch to establish an entry in a table to cause the first open flow switch to send a copy of the RTCP packets corresponding to the first RTCP packet stream to the SBC while also communicating (e.g., forwarding) the RTCP packets corresponding to the first RTCP packet stream towards the intended first RTCP packet stream destination.

System Embodiment 2. The system of system embodiment 1, wherein said processor included in the SBC further controls the SBC to determine the session identification information identifying the first RTCP packet stream corresponding to the first media stream based on information included in an SDP Offer-Answer exchange with a first peer device.

System Embodiment 3. The system of system embodiment 1, wherein said SDN controller includes a processor, said processor controls the operation of the SDN controller to generate an entry in a group table, said entry including RTCP packet flow identification information identifying the first RTCP packet flow and an address of the SBC to which copies of packets in the first RTCP flow are to be forwarded.

System Embodiment 4. The system of system embodiment 3, wherein said group table is in the first open flow controlled switch.

System Embodiment 5. The system of system embodiment 3, wherein said entry contains a first bucket and a second bucket, said first bucket containing instructions to copy the packets of the first RTCP packet flow and forward said packets toward the SBC, said second bucket containing instructions to forward the packets of the first RTCP flow toward the intended RTCP packet stream destination (e.g., other peer, after performing topology hiding).

System Embodiment 6. The system of system embodiment 3, wherein: operating the first open flow switch to forward copies of the RTCP packets for the first media session to the SBC using the SBC address included in the group table as a destination address.

System Embodiment 7. The system of system embodiment 6, wherein said processor in said SBC further controls the SBC to: receive the forwarded copies of the RTCP packets for the first media session from the first open flow switch; identify that said received RTCP packets correspond to said first RTCP stream based on the SBC IP address port pair at which the RTCP packets are received or from information contained in the received RTCP packets (5 Tuple); analyze the received RTCP packets to determine one or more Quality of Service (Qos) metrics; and communicate network control information to said SDN network controller.

System Embodiment 8. The system of system embodiment 7 wherein the network control information includes at least one of one or more Quality of Service metrics.

System Embodiment 9. The system of system embodiment 7 wherein the network control information includes a subset of the Quality of Service metrics determined by analyzing the received RTCP packets.

System Embodiment 10. The system of system embodiment 7 wherein the network control information includes all of the Quality of Service metrics determined by analyzing the received RTCP packets over a specified time period.

System Embodiment 11. The system of system embodiment 7 wherein the network control information includes an indication that a Quality of Service level specified for the media session is not being met.

System Embodiment 12. The system of system embodiment 7 wherein the one or more Quality of Service metrics includes at least one of the following: R-Factor, network-packet loss, or packets discarded due to jitter.

System Embodiment 13. The system of system embodiment 7 wherein said processor in the SDN controller controls the SDN controller to: receive said network control information; analyze said network control information; and when said SDN controller determines that a condition has been satisfied control the SDN controller to: i) indicate to the first open flow switch a new priority level for the RTP packets of the first media session, ii) control at least one switch to alter a path for the first media session, or iii) control at least one switch to alter a path for a second media session to alleviate a detected Quality of Service problem based on said received network control information (e.g., redirect second media session RTP packets so that it is no longer flowing through the first open flow switch thereby providing additional first switch bandwidth to the first media session).

System Embodiment 14. The system of system embodiment 13 wherein said processor included in the SDN controller controls the SDN controller to determine that said condition has been satisfied when the SDN controller determines that a QoS level has not been met for said first media session based on said network control information.

System Embodiment 15. The system of system embodiment 14 wherein said SDN controller determines that a QoS level has not been met for said first media session when said network control information includes an indication that a QoS level has not been met for said first media session.

System Embodiment 16. The system of system embodiment 15 wherein said indication that a QoS level has not been met in said network control information is a flag that is set and wherein said network control information further includes said session identification information.

System Embodiment 17. The system of system embodiment 13 wherein said processor included in said SDN controller further controls the SDN controller to determine network routing paths in response to new media session requests which optimize network bandwidth utilization based on the received network control information.

System Embodiment 18. The system of system embodiment 1 wherein the RTP packets of the first media session are not sent to the SBC.

System Embodiment 19. The system of system embodiment 1 wherein the RTP packets of the first media session do not pass through the SBC.

System Embodiment 20. The system of system embodiment 19 wherein the RTP packets of the first media session do not pass through said SDN controller.

System Embodiment 21. The system of system embodiment 19 wherein the SBC is a signaling SBC (S-SBC).

System Embodiment 22. The system of system embodiment 21 wherein the SBC and SDN controller communicate using a Representation State Protocol (REST) or a proprietary protocol.

System Embodiment 23. The system of system embodiment 1 wherein said SDN controller and said first open flow switch communicate using Open Flow protocol.

System Embodiment 24. The system of system embodiment 7, wherein said processor included in said SBC further controls the SBC to store or log the RTCP information into one or more Call Data Records in a memory or storage device.

System Embodiment 25. The system of system embodiment 7, wherein said processor included in said SBC further controls the SBC to communicate QoS information to a routing engine for use in making future network routing decisions.

List of Set of Exemplary Numbered Computer Readable Medium Embodiments

Computer Readable Medium Embodiment 1. A non-transitory computer readable medium including computer executable instructions which when executed by one or more processors of a session border controller (SBC) cause the SBC to perform the steps of: receiving a session initiation signal used to initiate a first media session; sending to an SDN controller session identification information (5 tuple information—source IP address, source transport port, protocol type, destination IP address, destination transport port) identifying a first RTCP packet stream corresponding to the first media session and causing said SDN controller to control a first open flow switch to establish an entry in a table to cause the first open flow switch to send a copy of the RTCP packets corresponding to the first RTCP packet stream to the SBC while also communicating (e.g., forwarding) the RTCP packets corresponding to the first RTCP packet stream towards the intended first RTCP packet stream destination.

The techniques of various embodiments may be implemented using software, hardware and/or a combination of software and hardware. Various embodiments are directed to apparatus, e.g., signaling session border controllers, controllers including SDN controllers, switches including SDN switches, telecommunications systems, network nodes and/or network equipment devices. Various embodiments are also directed to methods, e.g., method of controlling and/or operating devices, signaling session border controllers, user devices, OpenFlow switches, SDN switches, SDN controller, real-time communications entities, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., signaling session border controller, switch or controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., signaling session border controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a signaling session border controller, with a processor which includes a component corresponding to each of the steps of the various described methods performed by the device in which the processor is included. In some but not all embodiments a device, e.g., communications node such as a signaling session border controller, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
receiving, by a session border controller (SBC), a session initiation signal used to initiate a first media session; and
sending, by the SBC to a Software Defined Network (SDN) controller, session identification information identifying a first Real-time Transport Control Protocol (RTCP) packet stream corresponding to the first media session and causing said SDN controller to control a first open flow switch to establish an entry in a first table to cause the first open flow switch to send a copy of RTCP packets corresponding to the first RTCP packet stream to the SBC while also communicating the RTCP packets corresponding to the first RTCP packet stream towards an intended first RTCP packet stream destination.

2. The communications method of claim 1, further comprising:
generating, by the SDN controller, an entry in a group table of the first open flow switch, said entry in the group table including RTCP packet stream identification information identifying the first RTCP packet stream and an address of the SBC to which the copy of the RTCP packets corresponding to the first RTCP packet stream are to be forwarded, said group table being a different table than said first table, said first table being a flow table, said entry in the first flow table being a flow table entry.

3. The communications method of claim 2, further comprising:
forwarding, by the first open flow switch, the copy of the RTCP packets corresponding to the first RTCP packet stream corresponding to the first media session to the SBC using the SBC address included in the group table as a destination address.

4. The communications method of claim 3, further comprising:
receiving, by the SBC, the forwarded copy of the RTCP packets corresponding to the first RTCP packet stream corresponding to the first media session from the first open flow switch;
identifying, by the SBC, that said received forwarded copy of the RTCP packets correspond to said first RTCP packet stream based on an SBC Internet Protocol (IP) address port pair of the SBC at which the forwarded copy of the RTCP packets corresponding to the first RTCP packet stream is received or from information contained in the forwarded copy of the RTCP packets corresponding to the first RTCP packet stream;
analyzing, at the SBC, the received forwarded copy of the RTCP packets to determine one or more Quality of Service (QoS) metrics; and
communicating, by the SBC, network control information to said SDN controller.

5. The communications method of claim 4, wherein the one or more Quality of Service metrics includes at least one of the following: R-Factor, network-packet loss, or packets discarded due to jitter.

6. The communications method of claim 4, further comprising:
receiving, by the SDN controller, said network control information;
analyzing, by the SDN controller, said network control information; and
when said SDN controller determines that a condition has been satisfied, operating the SDN controller to: i) indicate to the first open flow switch a new priority level for Real-time Transport Protocol packets of the first media session, ii) control at least one switch to alter a path for the first media session, or iii) control at least one switch to alter a path for a second media session to alleviate a detected Quality of Service problem based on said received network control information; and
wherein said at least one switch includes at least the first open flow switch or an additional switch.

7. The communications method of claim 6, further comprising:
determining, by the SDN controller, network routing paths in response to new media session requests which optimize network bandwidth utilization based on the received network control information.

8. The communications method of claim 4, further comprising:
storing or logging, by the SBC, RTCP information determined, by the SBC, from said received RTCP packets into one or more Call Data Records.

9. The communications method of claim 4, further comprising:
communicating, by the SBC, QoS information to a routing engine for use in making future network routing decisions, said QoS information being based on said QoS metrics.

10. The communications method of claim 1, wherein the SBC is a signaling SBC (S-SBC).

11. The communications method of claim 1, wherein said first table is a flow table.

12. The communications method of claim 11,
wherein said entry in said first table includes a group identifier (ID) identifying a group table entry in a group table of the first open flow switch, said group table entry being established with or prior to said entry in said first table.

13. A communications system comprising:
a first open flow switch;
a Software Defined Network (SDN) controller; and
a session border controller (SBC), said SBC including:
memory; and
a processor that controls the SBC to:
receive a session initiation signal used to initiate a first media session; and
send to the SDN controller session identification information identifying a first Real-time Transport Control Protocol (RTCP) packet stream corresponding to the first media session and causing said SDN controller to control the first open flow switch to establish an entry in a first table to cause the first open flow switch to send a copy of RTCP packets corresponding to the first RTCP packet stream to the SBC while also communicating the RTCP packets corresponding to the first RTCP packet stream towards an intended first RTCP packet stream destination.

14. The communications system of claim 13, wherein said SDN controller includes a processor, wherein said processor in the SDN controller controls the operation of the SDN controller to generate an entry in a group table of the first open flow switch, said entry in the group table including RTCP packet stream identification information identifying the first RTCP packet stream and an address of the SBC to which the copy of the RTCP packets corresponding to the first RTCP packet stream are to be forwarded, said group table being a different table than said first table, said first table being a flow table, said entry in the first flow table being a flow table entry.

15. The communications system of claim 14, wherein:
the first open flow switch forwards the copy of the RTCP packets corresponding to the first RTCP packet stream corresponding to the first media session to the SBC using the SBC address included in the group table as a destination address.

16. The communications system of claim 15, wherein said processor in said SBC further controls the SBC to:
receive the forwarded copy of the RTCP packets corresponding to the first RTCP packet stream of the first media session from the first open flow switch;
identify that said received forwarded copy of the RTCP packets correspond to said first RTCP packet stream based on an SBC Internet Protocol (IP) address port pair of the SBC at which the forwarded copy of the RTCP packets corresponding to the first RTCP packet stream is received or from information contained in the forwarded copy of the RTCP packets corresponding to the first RTCP packet stream;
analyze the received forwarded copy of the RTCP packets to determine one or more Quality of Service (QoS) metrics; and
communicate network control information to said SDN controller.

17. The communications system of claim 16, wherein the one or more Quality of Service metrics includes at least one of the following: R-Factor, network-packet loss, or packets discarded due to jitter.

18. The communications system of claim 16, wherein said processor in the SDN controller controls the SDN controller to:
receive said network control information;
analyze said network control information; and
when said SDN controller determines that a condition has been satisfied controls the SDN controller to: i) indicate to the first open flow switch a new priority level for Real-time Transport Protocol packets of the first media session, ii) control at least one switch to alter a path for the first media session, or iii) control at least one switch to alter a path for a second media session to alleviate a detected Quality of Service problem based on said received network control information; and
wherein said at least one switch includes at least the first open flow switch or an additional switch.

19. The communications system of claim 18, wherein said processor included in said SDN controller further controls the SDN controller to determine network routing paths in response to new media session requests which optimize network bandwidth utilization based on the received network control information.

20. The communications system of claim 16, wherein said processor included in said SBC further controls the SBC to store or log RTCP information determined from said received RTCP packets into one or more Call Data Records in the memory of the SBC or in a storage device.

21. The communications system of claim 16, wherein said processor included in said SBC further controls the SBC to communicate QoS information to a routing engine for use in making future network routing decisions, said QoS information being based on said QoS metrics.

22. The communications system of claim 13, wherein the SBC is a signaling SBC (S-SBC).

23. A non-transitory computer readable medium including computer executable instructions which when executed by one or more processors of a session border controller (SBC) cause the SBC to perform the steps of:
receiving a session initiation signal used to initiate a first media session; and
sending to a Software Defined Network (SDN) controller session identification information identifying a first Real-time Transport Control Protocol (RTCP) packet stream corresponding to the first media session and causing said SDN controller to control a first open flow switch to establish an entry in a table to cause the first open flow switch to send a copy of the RTCP packets corresponding to the first RTCP packet stream to the SBC while also communicating the RTCP packets corresponding to the first RTCP packet stream towards an intended first RTCP packet stream destination.

24. A communications method, the method comprising:
receiving, by a session border controller (SBC), a session initiation signal used to initiate a first media session; and
sending, by the SBC to a Software Defined Network (SDN) controller, session identification information identifying a first Real-time Transport Control Protocol (RTCP) packet stream corresponding to the first media session and causing said SDN controller to control a first open flow switch to establish a flow entry in a flow table to match a group identifier (ID) maintained in a group table to cause the first open flow switch to send a copy of RTCP packets corresponding to the first RTCP packet stream to the SBC while also communicating the RTCP packets corresponding to the first RTCP packet stream towards an intended first RTCP packet stream destination.

25. The communications method of claim 24, further comprising:
generating, by the SDN controller, a group entry in the group table, said group entry in the group table is identified by said group ID and includes RTCP packet stream identification information identifying the first RTCP packet stream and an address of the SBC to which the copy of the RTCP packets corresponding to the first RTCP packet stream are to be forwarded.

26. A communications method, the method comprising:
receiving, by a session border controller (SBC), a session initiation signal used to initiate a first media session; and
sending, by the SBC to a Software Defined Network (SDN) controller, session identification information identifying a first Real-time Transport Control Protocol (RTCP) packet stream corresponding to the first media session and causing said SDN controller to control a first programmable switch to establish an entry in a table to cause the first programmable switch to send a copy of RTCP packets corresponding to the first RTCP packet stream to the SBC while also communicating the RTCP packets corresponding to the first RTCP packet stream towards an intended first RTCP packet stream destination.

27. The communications method of claim 26, wherein said entry in said table includes instructions for generating the copy of the RTCP packets and sending the copy of RTCP packets corresponding to the first RTCP packet stream to the SBC while also communicating the RTCP packets corresponding to the first RTCP packet stream towards an intended first RTCP packet stream destination.

* * * * *